(12) United States Patent
Heagy et al.

(10) Patent No.: US 7,025,580 B2
(45) Date of Patent: Apr. 11, 2006

(54) METHOD AND APPARATUS FOR LINING A CONDUIT

(76) Inventors: Richard T. Heagy, 2027 Park Grind, Houston, TX (US) 77062; Cynthia D. Heagy, 2027 Park Grind, Houston, TX (US) 77062; Tom R. Menger, 232 W. Silversands, San Antonio, TX (US) 78216; John Simonis, 5118 Timber Trace, San Antonio, TX (US) 78250

( * ) Notice: Subject to any disclaimer, the term of this patent is extended or adjusted under 35 U.S.C. 154(b) by 346 days.

(21) Appl. No.: 09/877,219

(22) Filed: Jun. 8, 2001

(65) Prior Publication Data
US 2002/0033554 A1    Mar. 21, 2002

Related U.S. Application Data

(60) Provisional application No. 60/210,368, filed on Jun. 9, 2000.

(51) Int. Cl.
*B29C 63/34* (2006.01)
*F16L 55/18* (2006.01)

(52) U.S. Cl. .......................... 425/11; 138/98; 138/108; 138/115; 138/137; 138/148; 156/287; 264/36.17; 405/184.2

(58) Field of Classification Search .................. 138/98, 138/108, 115, 137, 148; 264/36.17, 516, 264/269; 425/11, 174.4; 156/287; 405/184.2
See application file for complete search history.

(56) References Cited

U.S. PATENT DOCUMENTS 2,794,758 A    6/1957    Harper et al. .................. 154/82
2,816,323 A    12/1957    Munger (Continued)

FOREIGN PATENT DOCUMENTS

DE      3603597      8/1987

(Continued)

OTHER PUBLICATIONS

WO 96/16790—International Application Published Under the PCT—Jun. 6, 1996.

(Continued)

*Primary Examiner*—James P. Mackey
(74) *Attorney, Agent, or Firm*—Law Office of Tim Cook P.C.

(57) ABSTRACT

Method and apparatus for installing a liner material into a host conduit such as, e.g., a sewer pipe, hydrocarbon pipeline, gas line, water line, industrial chemical pipe, or a saltwater line. The liner material may include a compression liner and/or a preliner that is attached to the inner wall of the host conduit to repair or reinforce the host conduit or separate the host conduit from materials transported within the new liner formed from the liner material. Curable resin, slurry, or cement can be placed between the liner material and the host conduit to affix the liner material into place. Before and during curing, a fluid such as air or water can be used to inflate the compression liner outwardly toward the host conduit. Spacers positioned between at least a portion of the liner material and the host conduit may be used to (i) calibrate the thickness of the liner material and curable material that is cured to form the new liner, and (ii) form communication channels adapted to house devices such as wire, cable, fiber optic cable, telephone lines, power lines, etc. The spacers and channels can be selectively inflatable to various sizes to allow calibration of the liner thickness and to form communication channels having a selected width or height. Additionally, the liner material may be formed into a one-piece, tubular lining member having an inflatable enclosure defined between an inner and an outer layer of the lining member. The enclosure can be selectively inflated to (i) calibrate the resulting thickness of the cured liner material, and (ii) form communication channels running along the length of the host conduit.

26 Claims, 21 Drawing Sheets

U.S. PATENT DOCUMENTS

| | | | |
|---|---|---|---|
| 3,400,737 A | 9/1968 | Matthews et al. | 138/111 |
| 4,009,063 A | 2/1977 | Wood | 156/71 |
| 4,064,211 A | 12/1977 | Wood | 264/95 |
| 4,273,605 A | 6/1981 | Ross | 156/286 |
| 4,366,012 A | 12/1982 | Wood | 156/93 |
| 4,585,371 A | 4/1986 | Jones-Hinton | 405/153 |
| 4,754,781 A | 7/1988 | de Putter | 138/98 |
| 4,867,921 A | 9/1989 | Steketee, Jr. | 264/36 |
| 4,963,420 A | 10/1990 | Jarrin et al. | 428/36.9 |
| 4,965,036 A | 10/1990 | Miyazaki et al. | 264/269 |
| 4,995,929 A | 2/1991 | Menzel | 156/187 |
| 5,072,622 A | 12/1991 | Roach et al. | 73/40.5 |
| 5,255,624 A | 10/1993 | Legare | 114/68 |
| 5,395,472 A | 3/1995 | Mandich | 156/287 |
| 5,546,992 A | 8/1996 | Chick et al. | 138/98 |
| 5,560,395 A | 10/1996 | Bissonnette et al. | 138/98 |
| 5,606,997 A | 3/1997 | Blackmore et al. | 138/98 |
| 5,725,328 A | 3/1998 | Schmager | 405/151 |
| 5,762,450 A | 6/1998 | Schmager | 405/154 |
| 5,765,597 A | 6/1998 | Kiest, Jr. et al. | 138/78 |
| 5,778,938 A | 7/1998 | Chick et al. | 138/98 |
| 5,785,456 A | 7/1998 | McAlpine | 405/154 |
| 5,791,378 A | 8/1998 | Stephens | 138/98 |
| 5,928,447 A | 7/1999 | GianFrancisco | 156/94 |
| 6,012,495 A | 1/2000 | Antonsen | 138/131 |
| 6,033,149 A | 3/2000 | McAlpine | 405/154 |
| 6,116,290 A * | 9/2000 | Ohrn et al. | 138/148 |
| 6,123,110 A * | 9/2000 | Smith et al. | 138/98 |
| 6,220,079 B1 | 4/2001 | Taylor et al. | 73/37 |
| 6,246,820 B1 * | 6/2001 | Le Cam et al. | 138/115 |
| 6,634,388 B1 * | 10/2003 | Taylor et al. | 138/114 |
| 6,935,376 B1 * | 8/2005 | Taylor et al. | 138/98 |

FOREIGN PATENT DOCUMENTS

| | | |
|---|---|---|
| GB | 2097892 | 11/1982 |
| GB | 2157797 | 10/1985 |
| JP | 54-116733 | 9/1979 |
| JP | 60-206623 | 10/1985 |
| JP | 64-42219 | 2/1989 |
| JP | 1-258938 | 10/1989 |
| JP | 2-199387 | 8/1990 |

OTHER PUBLICATIONS

WO 00/06933—International Application Published Under the PCT—Feb. 10, 2000.

*The Final Mile Solution—TROLINING System With Integrated Cable Ducts*; Article from Evanco Environmental Website dated Jun. 1, 2001, pp. 1-3.

* cited by examiner

METHOD AND APPARATUS FOR LINING A CONDUIT

This application claims priority based upon U.S. Provisional Application No. 60/210,368 filed on Jun. 9, 2000, which is incorporated by reference as if fully set forth herein.

BACKGROUND OF THE INVENTION

1. Field of the Invention

The present invention generally relates to lining the interior of a host conduit (e.g., pipe, vessel, etc.) with a liner material to repair or reinforce the conduit or separate the conduit from materials that are contained or transported through the newly formed liner within the conduit. More particularly, an embodiment of the invention relates to fixing a liner material into a conduit with curable material wherein spacers are inserted between at least a portion of the liner material and the conduit in order to calibrate the thickness of the liner material and to create communication channels lengthwise along the conduit for housing devices such as wires and fiber optic cables for carrying communication signals. The host conduit can be any pipe for containing fluids, gases, solids, or mixtures thereof, including a sewer pipe, oil pipeline, gas line, pipe for containing industrial chemicals, water pipe, a pipe for containing saltwater in an oilfield, etc.

2. Description of the Related Art

Various methods exist for restoring or replacing underground pipes such as sewer pipes that have corroded or crumbled. Access to such pipes is often difficult and the excavation required to dismantle and/or remove the pipes can be expensive, disruptive, and time-consuming.

U.S. Pat. No. 4,064,211, issued on Dec. 20, 1977 to Wood, relates to a "method of lining passageways in which a flexible tubular member is progressively fed into the passageway and is pressed by fluid pressure against the surface to be lined." (Col. 1, lines 23–27). This patent is incorporated by reference as if fully set forth herein. "The flexible tubular member is of a material that is impregnated with a synthetic resin in the liquid state." (Col. 1, lines 27–29). Fluid pressure is used to "invert" the tubular member through the passageway. (Col. 1, lines 42–58). "Upon hardening, the resin causes the tubular member to form a rigid lining in the passageway." (Col. 1, lines 29–31).

U.S. Pat. No. 5,546,992, issued on Aug. 20, 1996 to Chick et al., relates to a dual containment pipe rehabilitation system that contains a "crush-resistant spacer disposed about the impervious primary containment pipe to form a uniform annular space." (Col. 2, lines 16–17). This patent is incorporated by reference as if fully set forth herein. A "resin absorbing material" is impregnated with a resin prior to eversion of the liner into the pipe. (Col. 5, lines 16–21). Resin is not injected into the uniform annular space. Instead, an "impervious material 19 is provided . . . to prevent resin . . . from migrating into annular space 17." (Col. 5, lines 21–24).

An important aspect of "presoaking" methods such as that disclosed by Wood and Chick et al., in the above-mentioned patents is that a fiber or fabric-type tube is impregnated with resin before it is installed into the host conduit. One disadvantage of such systems is the increased costs associated with having to presoak the fabric with resin before it is inserted within the host conduit. Special equipment is required to "wet" the fabric, and it is difficult to handle the "wet" fabric while attempting to install it into the host conduit. Another disadvantage of these systems is the relatively high cost of the fabric or fiber and the relatively high labor costs associated with fabricating the tubes. Additionally, the use of "presoaking" methods typically results in "fiber-weakening," which causes a reduction in strength of the newly formed liner and its capacity to hold pressurized fluids.

Other methods exist to place a liner in a pipe or vessel without presoaked fabric tubes. One disadvantage that typically occurs in methods lacking presoaked fabric tubes is the inability to adequately control "slump" of resin toward the bottom of the pipe or vessel. "Slump" is the tendency of matter to respond to the force of gravity and to settle to the bottom of the pipe or vessel, which makes it difficult or impossible to control the evenness of the newly cured lining within the host conduit. Such slump distorts the thickness of the new liner by causing uneven thickness of the wall of the newly formed lining and usually causes the lining to have a thicker bottom and a thinner top. In order to reduce slump, it has been necessary in some methods to use a relatively viscous resin that will resist flowing under the force of gravity in order to allow the resin to be cured before it has settled near the bottom of the host conduit.

U.S. Pat. No. 5,762,450, issued on Jun. 9, 1998 to Schmager, relates to a system and method for relining a sewer pipe section that uses inliners and a plurality of nubs that serve as spacers to reserve an annular space between the inliners. (Col. 3, lines 12–17). This patent is incorporated by reference as if fully set forth herein. Separations between the nubs, however, make the nubs ineffective for preventing slump of resin toward the bottom of the sewer pipe.

Therefore, there remains a need in the art for an apparatus and method for more easily and efficiently installing a liner into a host conduit with minimal trenching and excavation and without the disadvantages of fiber-weakening and slump.

SUMMARY OF THE INVENTION

In accordance with the present invention, a method and apparatus for lining a host conduit is provided that largely eliminates or reduces the aforementioned disadvantages of other methods for lining conduits.

An embodiment of the invention relates to lining a host conduit by (a) placing a lining member into a host conduit; (b) inflating a portion of the lining member; (c) introducing a curable material within a portion of the lining member; and (d) curing the curable material to form a new liner within the host conduit. The lining member can include an inner layer, an outer layer, and an inflatable enclosure formed between the inner layer and the outer layer. The fluid is preferably introduced into the enclosure to inflate the lining member, thereby creating a selected spacing between the inner layer and the outer layer. The fluid may be curable material that is injected into the selected spacing. Once the curable material is cured, a new liner is formed that preferably has a wall thickness that is substantially equal to the selected spacing formed by inflating the enclosure.

In an embodiment of the invention, a liner material is placed into the host conduit, and the liner material is configured to form a plurality of channels located between at least a portion of the liner material and the host conduit. Each of the channels is isolated from a neighboring channel by a spacer so that the channels are separately inflatable. Curable material is introduced into at least some of the channels to inflate them, thereby creating a selected annular spacing between the liner material and the host conduit.

Finally, the curable material is cured to fix the liner material in place within the host conduit. At least one of the channels is preferably left substantially free of curable material so that a fiber optic cable can be placed into that channel.

In an embodiment of the invention, a substantially flexible liner having a substantially cylindrical shape and a width is formed such that the liner has a surface with a slit running axially along the surface that facilitates compression of the liner. A compressive force is exerted on the liner to compress the liner and thereby reduce the width of the liner. The liner can then be inserted within the host conduit while the compressive force is maintained on the liner. At least some of the compressive force is removed from the liner to cause the liner to expand in a radial direction, thereby fixing the liner in place within the host conduit. At least a portion of the liner is preferably inserted into a sled bag to exert the compressive force on the liner. The liner may be a shunt insert that is positioned adjacent to an offset in the host conduit.

In an embodiment of the invention, a liner material is placed into the host conduit and a plurality of spacers are located between at least a portion of the liner material and the host conduit at various locations around the circumference of the host conduit to create a first selected spacing between the liner material and the host conduit that is defined by the plurality of spacers. The spacers may be located between the liner material and the host conduit by forming the spacers on or within the liner material and then installing the liner material into the pipe or by installing the liner material first and then subsequently adding the spacers adjacent to the liner material. The spacers may be said to be located between a portion of the liner material and the host conduit when the spacers are positioned within the liner material with liner material on each side of the spacer relative to the position of the host conduit. An additional spacer or spacers having a different width than the other spacers may be located between the liner material and the host conduit, thereby creating a second selected spacing between the liner material and the host conduit that is different than the selected spacing at another part of the liner material. Curable material can be placed within the host conduit and cured to fix the liner material within the host conduit and form a new liner within the host conduit with a non-uniform wall thickness such that the new liner is relatively thick near a selected area of the host conduit.

In an embodiment of the invention, a first liner material that is substantially flexible and has a central passageway or lumen is placed into a host conduit. A second liner material that is substantially inflatable is placed into the host conduit within the lumen of the first liner material. The second liner material includes an inner surface and an outer surface. A spacer can be located between the first liner material and the outer surface of the second liner material to maintain an annular spacing therebetween where curable material is placed. Fluid can be introduced within the second liner material to exert a force against the inner surface of the second liner material to inflate the second liner material toward the host conduit. The curable material is cured to fix the first and second liner material into position within the host conduit. Finally, a hanging communication channel that is adapted to house a communication device can be located on the inner surface of the second liner. A fiber optic cable can be inserted into the hanging communication channel. Locating the fiber optic cable within the hanging channel facilitates inspection, installation, and servicing of the cable. The first and second liner materials are preferably formed into a unitary lining member prior to being placed into the host conduit, and the spacer is preferably a seam running between the first and second liner material.

In an embodiment of the invention, a substantially flexible liner material having a lumen and a plurality of channels running in a direction lengthwise down the host conduit is installed into the host conduit. The channels are formed between spacers that prevent liquid from passing between the channels. Fluid is introduced into the lumen of the liner material to expand the liner material in a radially outward direction toward the host conduit. Curable material is introduced into at least some of the plurality of channels to form filled channels, with the curable material being introduced separately into the filled channels. In this manner, slump is inhibited or eliminated. Finally, the curable material can be cured to fix the liner material in position within the host conduit. At least one of the plurality of channels is preferably left substantially free or empty of curable material to form a communication channel, and a communications device is inserted into that channel.

In an embodiment of the invention, a liner material is placed into a host conduit that includes an inner wall, and the liner material includes an inner surface and an outer surface, with the inner surface defining a lumen and the outer surface comprising a plurality of protruding spacers running in a lengthwise direction down the liner material. A fluid is introduced into the lumen to expand the liner material toward the inner wall of the host conduit, thereby forming a plurality of substantially continuous channels running in a lengthwise direction down the host conduit, with the channels being formed between the protruding spacers. Curable material is introduced into at least some of the channels, and the curable material is cured within the channels to form a new liner within the host conduit. The spacers may be pressed directly against the inner wall of the host conduit during inflation and expansion of the liner material so that the channels are defined by the spacers and the inner wall of the host conduit. At least one of the channels is preferably left substantially free of curable material to form a communication channel into which a fiber optic cable can be inserted.

In one embodiment of the invention, a protective covering such as a sled bag is placed over the liner material to protect the liner material from snagging protrusions on the host conduit during installation. The liner material is preferably at least partially inserted within the protective covering to substantially inhibit the liner material from moving into objects protruding from the host conduit. The protective covering includes a front end and a back end, and the liner material is positioned into the host conduit by moving the protective covering through the host conduit while simultaneously releasing the liner material from the back end of the protective covering to reduce or eliminate movement of the liner material directly across the inner wall of the host conduit. The protective cover may then be removed from the host conduit, and curable material can be inserted into the host conduit at a location adjacent to the liner material. The curable material is then cured to form a new liner within the host conduit. A substance may be placed onto the front end of the protective covering to reduce friction between the inner wall and the protective covering during movement of the protective covering through the host conduit.

In one embodiment of the invention, a lining member having a unitary construction is provided for lining an inner wall of a host conduit that is adapted to contain fluid. The lining member is inflatable and sufficiently flexible to permit it to be inserted through the host conduit. The lining member is capable of being substantially flattened (e.g., rolled, folded, compressed) before it is inflated. The lining member includes a substantially flexible outer layer and a substantially flexible inner layer attached to the outer layer that defines a bore when the fluid is introduced within the inner layer. The lining member further includes an inflatable enclosure that is defined between the inner layer and the outer layer (exterior to the bore) and separately inflatable from the bore of the inner layer. The enclosure is capable of receiving and containing curable material, which is used to form the new liner in the host conduit. The lining member further includes one or more substantially flexible spacers positioned within the inflatable enclosure, and the spacers form one or more channels running in a direction lengthwise along the lining member. The lining member is expandable toward the inner wall of the host conduit during inflation of the enclosure. The lining member is further adapted to receive and contain the curable material in the enclosure while the curable material is being cured to form a new liner within the host conduit.

The inner layer of the lining member can operate like an inflatable bladder by defining a bore located exterior to the enclosure that is separately inflatable from the enclosure to expand the lining member radially toward the host conduit. The fluid introduced into the enclosure to inflate the liner material is preferably the curable material. The fluid introduced into the central bore or lumen is preferably water or air.

The lining member preferably has a unitary construction such that the inner layer, outer layer, and spacers are formed together as a single component so that the inner layer, outer layer, and spacers are installed into the host conduit simultaneously. Alternatively, the inner layer of the lining member may be a separate compression liner and the outer layer may be a separate preliner, and different portions of the lining member may be separately installed into the host conduit at different times.

The lining member preferably is flexible and preferably includes flexible and/or inflatable spacers for defining the spacing between the inner layer and the outer layer during curing so that the lining member and spacers can be folded, rolled, compressed, etc. before being installed in the host conduit, which may be accomplished by inverting the lining member or pulling it through the conduit.

The curable material is preferably a resin selected from the group consisting of a polyester resin and a vinyl ester resin, and curing is preferably accomplished by applying ultraviolet light or other radiation to the resin, applying heat to the resin, using ultrasonics, and/or mixing the resin with a catalyst. In order to facilitate installation, the curable material preferably has a viscosity prior to curing that is less than about 500 centipoise at 77° F.

The lining member preferably includes a spacer within the enclosure that defines the spacing between the inner layer and the outer layer and ultimately determines the approximate thickness of the new cured-in-place liner. A spacer such as a rib may be inserted within the enclosure during or after installation of the lining member to create a predetermined spacing between the inner and outer layer so that the new liner has a predetermined wall thickness. The step of introducing fluid into the enclosure and/or channels may form a channel in the lining member by inflating the lining member or otherwise defining the shape of the channel. A communication device such as a fiber optic cable can be inserted into one of the channels. A communication device can also be inserted into the host conduit by using a hollow rib or spacer that contains a communication channel.

The spacers may be seams and/or corrugations within the enclosure that define channels within the enclosure. The channels are preferably pre-formed into the lining member but may instead be added after the lining material has been inserted into the host conduit. A reinforcing mesh may be added to a channel or to the main lining member to strengthen the channel or lining member. The reinforcing mesh preferably substantially surrounds the inner surface of the lining member or channel to reinforce the new liner.

The channels are preferably separately inflatable and have a configuration to inhibit slump when the curable material is introduced into the enclosure. A hanging channel can be formed on the inner surface of the lining member so that it extends into the lumen or bore that is located exterior to the enclosure. A rib may be inserted into a channel to create a more rigid or flexible surface for housing a communication device.

A solid rib may be used to define the spacing between the inner and the outer layer of the enclosure. The solid rib can contain various openings in its surface that communicate with voids. The curable material can be passed through the openings and into the voids to strengthen the spacer and reinforce the lining member. The spacers around the circumference of the lining member may have different sizes so that the new liner has a non-uniform thickness. In this manner, the new liner can be made relatively thick in a selected area of the host conduit. The spacers may be arranged in multiple rows with a first row of spacers being stacked on top of a second row of spacers. Each row of spacers can define a separate enclosure. The rows of spacers may be regimented such that the spacers or seams are in line with one another. Alternatively, the rows of spacers may be staggered so that the seams are offset from one another. Staggered rows of spacers can be used to increase the capacity of the lining member for holding higher pressures.

The channels are preferably capable of holding an internal pressure that determines the size of the channels. Fluid is introduced into the channels to pressurize the channels to a selected pressure, thereby altering the size of the channels and thus altering the spacing between the inner layer and outer layer of the enclosure. In this manner, the thickness of the new liner can be controlled by controlling the pressure contained within the channels.

The lining member preferably includes a number of channels in the enclosure that are defined by the spacers. The channels may have openings in their walls to permit fluid to pass between the channels. Alternatively, the channels may be isolated from one other so that the channels are separately inflatable to different pressures and different sizes. The new liner preferably has a wall thickness that is substantially equal to the selected spacing defined by the size of the spacers.

The spacers preferably have the same size so that the newly formed liner has a uniform wall thickness. Support members may be placed between the spacers to maintain the spacers at a predetermined spacing relative to one another.

In one embodiment of the invention, an opening is made in the outer layer of the lining member so that curable material can be passed through the opening to the host conduit to repair a defect or damaged area in the host conduit. The lining member preferably has a length that is greater than about 250 feet so that it can be extended continuously from one manhole to another. A protective covering may be used to cover the lining member as it is installed to inhibit the lining member from contacting objects within the host conduit. A shunt insert may be installed into the host conduit adjacent to an offset in the host conduit before the liner material is installed. In this manner, any change in diameter in the host conduit resulting from the offset can be made more gradual.

The lining member may include a lateral intercept liner that extends from the outer layer of the lining member. Once a lateral pipe is located, the lateral intercept liner can be extended from the host conduit into the lateral pipe, and curable material can be inserted into the lateral intercept liner to cure it in place. A tapered smoothing device is preferably passed through the lining member to smooth the new liner as it is being formed in the host conduit. The smoothing device may include an ultraviolet light source or a heat source to initiate and promote curing of the curable material.

The host conduit can be an underground pipe, a pipeline, a pipe for contending hydrocarbons, a pipe for containing salt water, a pipe for containing industrial chemicals, a water pipe, a sewer pipe, etc. The pressure within the central bore formed by the inner surface of the lining material is preferably between about 5 psig and about 10 psig. The pressure contained in the enclosure formed between the inner and outer surface of the lining material is preferably slightly greater than the pressure within the central bore. In cases where a channel is left open for housing a communication device, the channel is preferably pressurized with air to a slightly greater pressure than that within the adjacent channels that contain curable material.

One advantage of an embodiment of the invention is permitting the wall thickness of a newly formed liner within the host conduit or vessel to be easily and accurately calibrated without the need for resin-impregnated tubes. The resin can be injected into the liner material after it has been inserted into the host conduit. This reduces costs, reduces the time needed to install cured-in-place liners, and results in a relatively strong liner by avoiding problems such as "fiber-weakening" and "felt-weakening" in the new cured-in-place liner.

Another advantage of an embodiment of the invention is that the spacers provide (i) a method of calibrating the thickness of the newly cured liner within the host conduit, and (ii) a communication avenue or channel through which cable, wires, fiber optic cable, or other devices may be placed or installed. The various configurations of embodiments of the present invention facilitate insertion, removal, and servicing of a communication device in the channel. These functions may be combined so that ribs (or another type of spacer) can be used to house communication fibers or cables and calibrate the wall thickness of the newly formed liner.

Yet another advantage of an embodiment of the invention is that the spacers and/or channels provide compartments that can reduce or eliminate "slump" in order to achieve a more uniform liner thickness. Additionally, the present invention provides a way to avoid slump without the need for curable material that is highly viscous; installation times can thus be reduced by using a curable material with a relatively low viscosity.

DESCRIPTION OF THE FIGURES

Further advantages of embodiments of the present invention will become apparent to those skilled in the art with the benefit of the following detailed description of the preferred embodiments and upon reference to the accompanying drawings in which.

Features of the invention are described in detail below with reference to the figures. Although various features have been depicted either individually or in combination for purposes of clarity and explanation, it will be appreciated by those skilled in the art that the features described below can be used either separately or in various additional combinations without departing from the scope of the invention.

DETAILED DESCRIPTION OF THE PREFERRED EMBODIMENTS OF THE INVENTION

Figure 1:
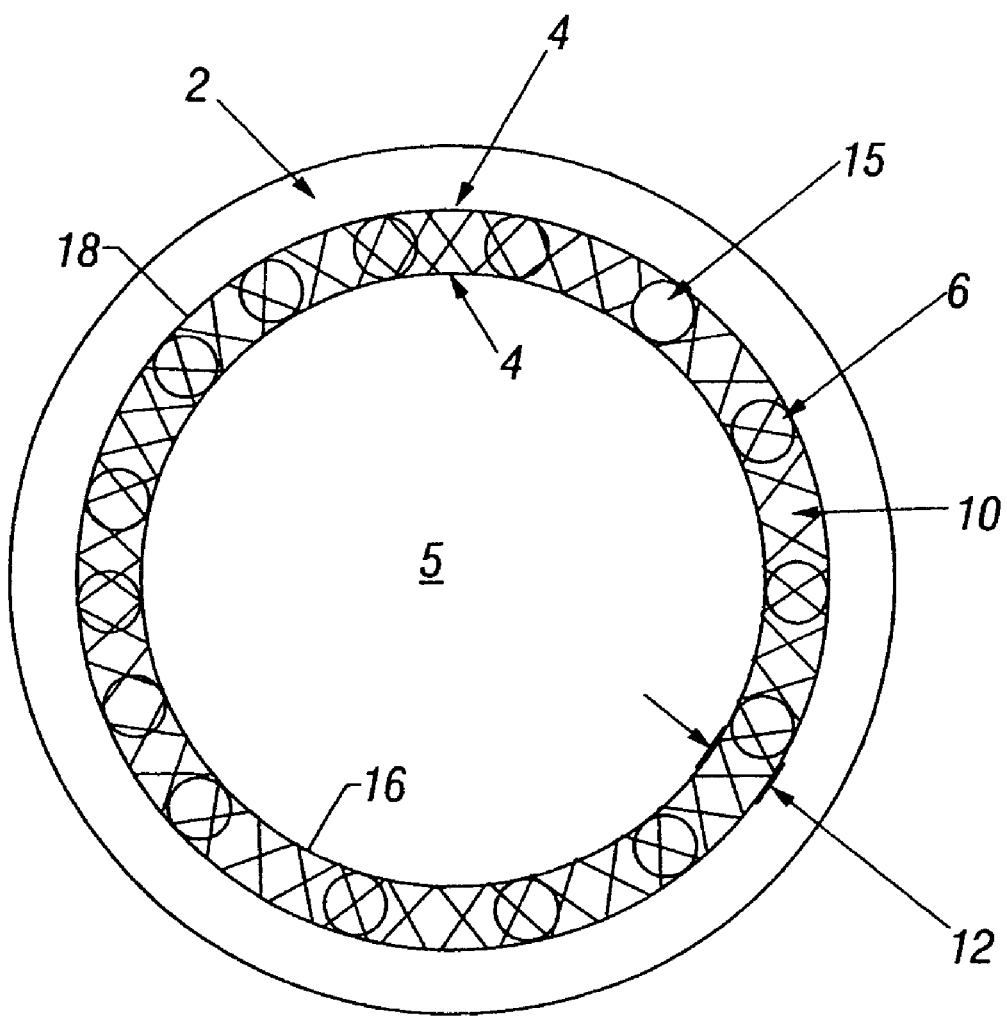
FIG. 1 depicts a lined conduit constructed in accordance with the present invention that includes liner material, curable material, and spacers.

FIG. 1 depicts an embodiment of a lined conduit constructed in accordance with the present disclosure. The host pipe or host conduit 2 contains a liner material 4 fixed (directly or indirectly) to the inner surface of the host conduit 2. Host conduit 2 can be any pipe or vessel (e.g., an underground sewer pipe) that is adapted to transport or contain a fluid (e.g., liquid, gas, mixture of liquid and gas, etc.). The liner material 4 forms a liner or shell to separate conduit 2 from materials (such as solids, corrosive materials, etc.) that are contained in the fluid transported through the host conduit. The liner material may be used to form a new pipe within the host conduit 2. The liner material 4 is thus preferably impermeable to the fluid and materials contained in the lumen or bore 5 of conduit 2. The liner material 4 may also be useful to correct defects in the host conduit due to corrosion or crumbling.

The liner material 4 is preferably substantially flexible and may be made from plastic, plastic sheets, coated fabric, fabric, other woven material, other polymer material, another flexible or flaccid material, or other suitable materials. For example, the liner material 4 may be polyvinyl, polyethylene, or polyurethane. The liner material may be extruded and/or heat-sealed to form a tubular member prior to its installation into the host conduit. If the liner material 4 is made of woven material, then the woven material preferably allows a selected amount of stretching to permit expansion radially outwardly in the hoop direction (i.e., about the circumference or perimeter) while permitting a lesser amount of stretching (or substantially no stretching at all) in a direction along the length of the host conduit. The liner material 4 is preferably a tube-like liner (i.e., it is formed in the shape of a tube) that can be flattened and/or rolled up prior to being installed within a host conduit. In one embodiment, the liner material is a plastic having a thickness of less than about 8 mm, and more preferably about 6 mm, 7 mm, or 8 mm.

As will be appreciated by one of skill in the art with the benefit of this description, the liner material 4 will be selected according to the specific application so that the newly formed liner will be appropriate for the operating conditions and compatible with the materials that will be transported or contained within the host conduit. The liner material can be made of Carilon® plastic (made by the Royal Dutch/Shell Group) for high temperature applications in which the temperature of the material transported within the lumen or bore of the newly formed liner will be about 200° F. or more. For intermediate temperature applications below about 200° F., the liner material can be made of Nylon-11. Liner material can be obtained from and fabricated by Liner Products, which is located at 1468 West Hospital Rd. in Paoli, Ind. 47454.

The liner material may contain a flocking, backing, or pad on its surface to facilitate bonding between the resin and the tube. The flocking is preferably a different material than the liner material. In one embodiment, the flocking is a fabric or a non-woven fiber pad having a fur-like consistency having a thickness between about 1.5 mm and about 8 mm. When compressed, the flocking can have a thickness of about less than 1 mm. The use of spacers and channels to calibrate the new liner thickness (as described below) preferably eliminates the need to use a bulky fabric pad for calibration of the new liner wall thickness. In this manner, embodiments of the present invention allow the liner material to be used with a relatively small amount of flocking or a relatively less bulky fabric pad, and the use of the lining member configurations described herein may eliminate the need for a flocking or pad altogether in some instances.

The liner material 4 may include only a single sheet or layer, or optionally, the liner material 4 can include separate liners that define an enclosure. For example, FIG. 1 depicts an embodiment in which the liner material includes a compression liner 16 in spaced relation from a preliner 18. The liner material 4 can be a tube-like member having an outer layer (e.g., preliner 18), an inner layer (e.g., compression liner 16), and an enclosure formed therebetween. Alternatively, the preliner 18 and the compression liner 16 may be unconnected, single-layer tubes that are separately installed into a host conduit. In either case, the preliner 18 and the compression liner 16 are each examples of "liner material" in the context of this specification, regardless of whether they are used singly or in combination, and regardless of whether they are separately installed or connected together to form an integral conduit lining member.

The preliner 18 can be a tube-like liner that is placed within the host conduit 2 and can rest directly against the inner wall of the host conduit 2 as shown in FIG. 1. The preliner 18 is usually made of plastic sheeting such as polyvinyl, polyethylene, or polyurethane, but it may instead be made of a woven material such as a fabric or coated fabric. The preliner 18 may be inverted into a host conduit by an inversion method or it may be pulled into the host conduit by pull-through methods that are known to those skilled in the art.

The compression liner 16 can be a tube-like liner or bladder that is positionable into the host conduit 2 and inside the preliner 18 by either being pulled into the interior of the preliner or inverted into the preliner. In either case, the compression liner is preferably positioned inside and parallel to the preliner and host conduit. The compression liner may be made of the same or similar materials as the preliner. The compression liner may also be used without a preliner. The compression liner 16 is preferably substantially flexible and inflatable by pressurizing the internal bore or lumen of the compression liner 16 with a fluid (e.g., gas, liquid, mixture of gas and liquid, etc.) such as air or water. Inflation of the compression liner 16 preferably expands it toward the inner wall of conduit 2.

The liner material 4 is preferably fixed into place within the conduit 4 by curable material 10. The curable material 10 may be a curable resin, a curable synthetic resin, a cement, a slurry, a grout, or any other suitable material. If a resin is used, it preferably is a thermoform resin, but a thermoset resin can also be used. Polyester resins and vinyl ester resins are two classes of resins that can be used in the method of the present invention. The polyester resins tend to have a relatively low cost and optionally may be isophthalic or orthopthalic. Vinyl ester resins that are epoxy-based tend to work well for relatively corrosive and higher temperature environments.

One exemplary resin that can be used in the present invention is XK117-41®, which is available from A.O.C., which is located at 4620 North Galloway Rd., Lakeland, Fla. 33810. Other exemplary resins include Dow Derakane 411®, Dow Derakane 8084®, and Dow Derakane 470®, which are each available from the Dow Chemical Company of Midland, Mich. It is believed that cement can also be used as the curable material to resist subsequent corrosion of the liner.

Curing may be accomplished by, e.g., heating (e.g., applying heated water or steam), applying ultraviolet light to the curable material, allowing the curable material to set for a selected time period, and/or including a catalyst within the curable material. "Curing" as used herein is additionally taken to include processes where that the "curable" material (e.g., a hardening cement) can be simply mixed and left for a selected time period to allow it to harden in the host conduit. The curable material preferably hardens upon curing to form a new conduit lining that includes the liner material 4. The liner material 4 itself may harden during the curing process. In the embodiment depicted in FIG. 1, the curable material 10 has cured and hardened to form part of the newly formed liner. In other embodiments, a portion of the liner material (e.g., compression liner 16) may be stripped out of the host conduit after curing has occurred.

If the liner configuration allows slump to occur, then a curable material that has a moderate or relatively high viscosity can be used to counteract and/or delay the slump effect. For example, curable material having a viscosity of between about 4,000 centipoise (cp) and about 7,000 cp at 77° F. can be used. When a host conduit having a relatively small diameter (i.e., about 10 inches or less) is repaired, however, it may be advantageous to use a curable material having a relatively low viscosity because this curable material can be pumped (or otherwise introduced) more quickly, easily, and inexpensively into the enclosure, channels, spacers, etc. formed in the liner material. One advantage of embodiments in the present disclosure, however, is that slump is eliminated or reduced because of the configuration of the conduit lining member, which permits the use of curable material having a relatively low viscosity. For example, the curable material can have a viscosity at 77° F. that is less than about 4,000 cp, and the most preferred ranges for the viscosity of the curable material at 77° F. are less than about 500 cp, between about 200 cp and about 500 cp, between about 400 cp and about 500 cp, and more preferably still between about 200 cp and about 250 cp. As will be appreciated by one skilled in the art with the benefit of this description, the exact viscosity will depend upon the particular application and the particular type of curable material used.

Figure 3:
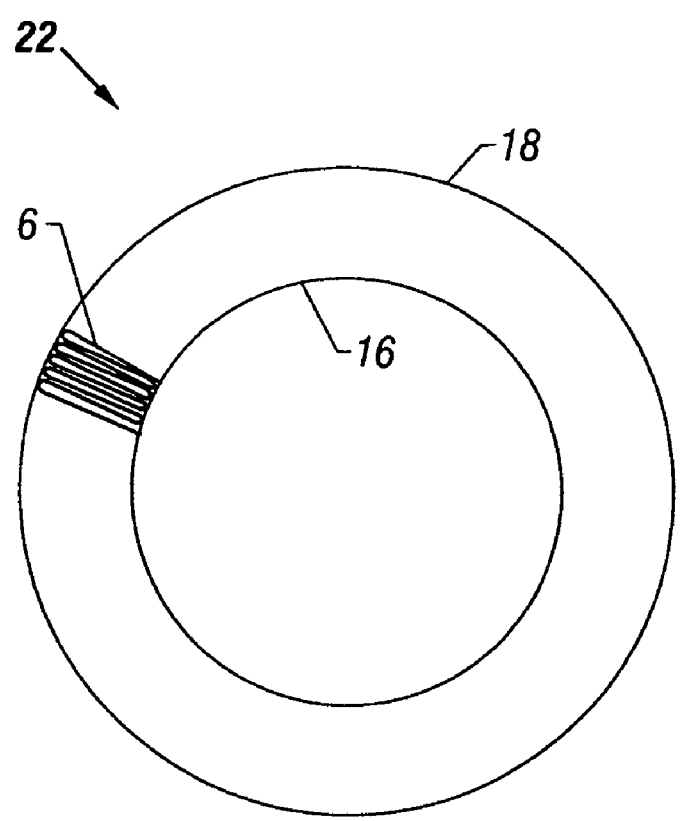
FIG. 3 depicts a conduit lining member with a spacer formed by bunching several folds of the liner material.

Spacers 6 are preferably positioned between at least one portion of the liner material 4 and the conduit 2. In some embodiments where the preliner 18 and the compression liner 16 are both incorporated into an integral tube-like conduit lining member, the spacers 6 may be located on the interior of the liner material between preliner 18 and compression liner 16. Each spacer 6 may be connected to the liner material and/or other spacers, or a spacer may be a stand-alone member. A spacer may be solid or hollow. A spacer can be flaccid, pliable, flexible, somewhat flexible, or rigid. The spacers can be made of, e.g., plastic, another substantially flexible material, fiberglass, metal, or the same material that the liner material 4 is made of. The spacers can have a shape that is round, oval, rectangular, or semicircular, or the spacers 6 may have an asymmetrical, uneven shape. In one embodiment, the spacers may have a random shape formed by bunching several folds of the liner material to form a ridge that acts as a rib as depicted in FIG. 3. Folds can be bunched in parallel with the liner, or perpendicular to the liner as shown in FIG. 3. When "U" shaped, the spacer may either have the arch of the "U" facing the wall of the host conduit, or the arch may face in the opposite direction toward the central bore of the host conduit. The spacer 6 can optionally be a rib 6 having a cross section that is circular, round, oval, plank-shaped, or U-shaped.

Figure 2:
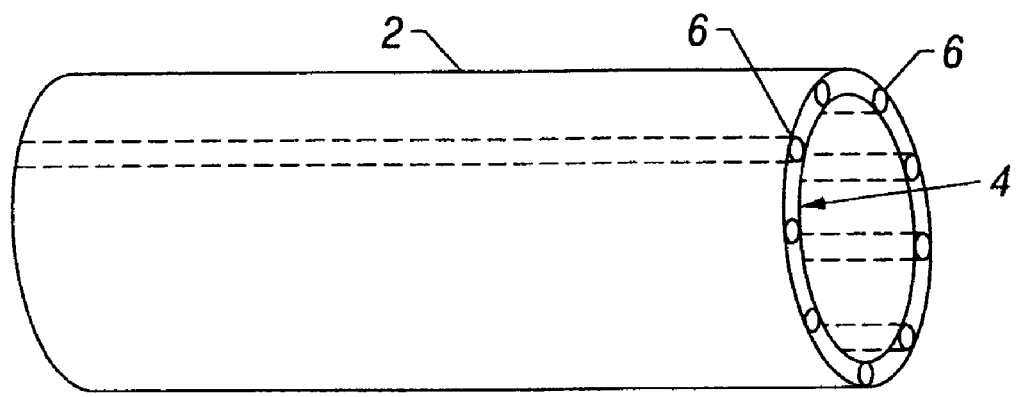
FIG. 2 depicts a perspective view of a conduit lining member.
Figure 4:
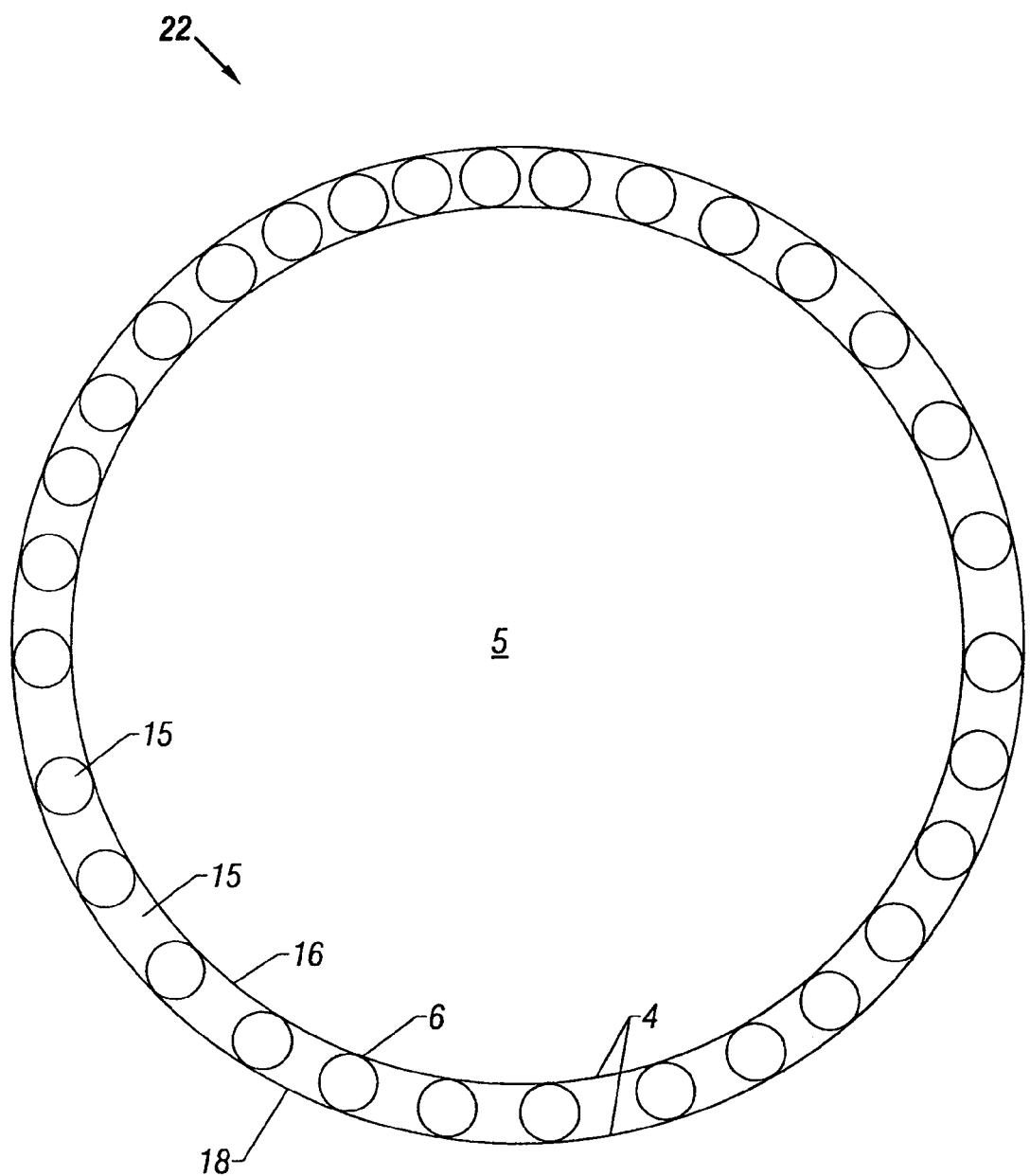
FIG. 4 depicts a conduit lining member in the inflated state with spacers that are ribs having a circular cross section.

One embodiment of a conduit lining member 22 is depicted in FIG. 4. The conduit lining member preferably has a unitary construction that includes preliner 18, compression liner 16, and spacers 6. In FIG. 4, the spacers are cylindrical ribs that run along the length of the conduit 2 as depicted in FIG. 2. The unitary construction of liner member 22 preferably enables the preliner, compression liner, and spacers to be installed simultaneously in a single step. Alternatively, each of the these components may be installed separately.

Figure 5A:
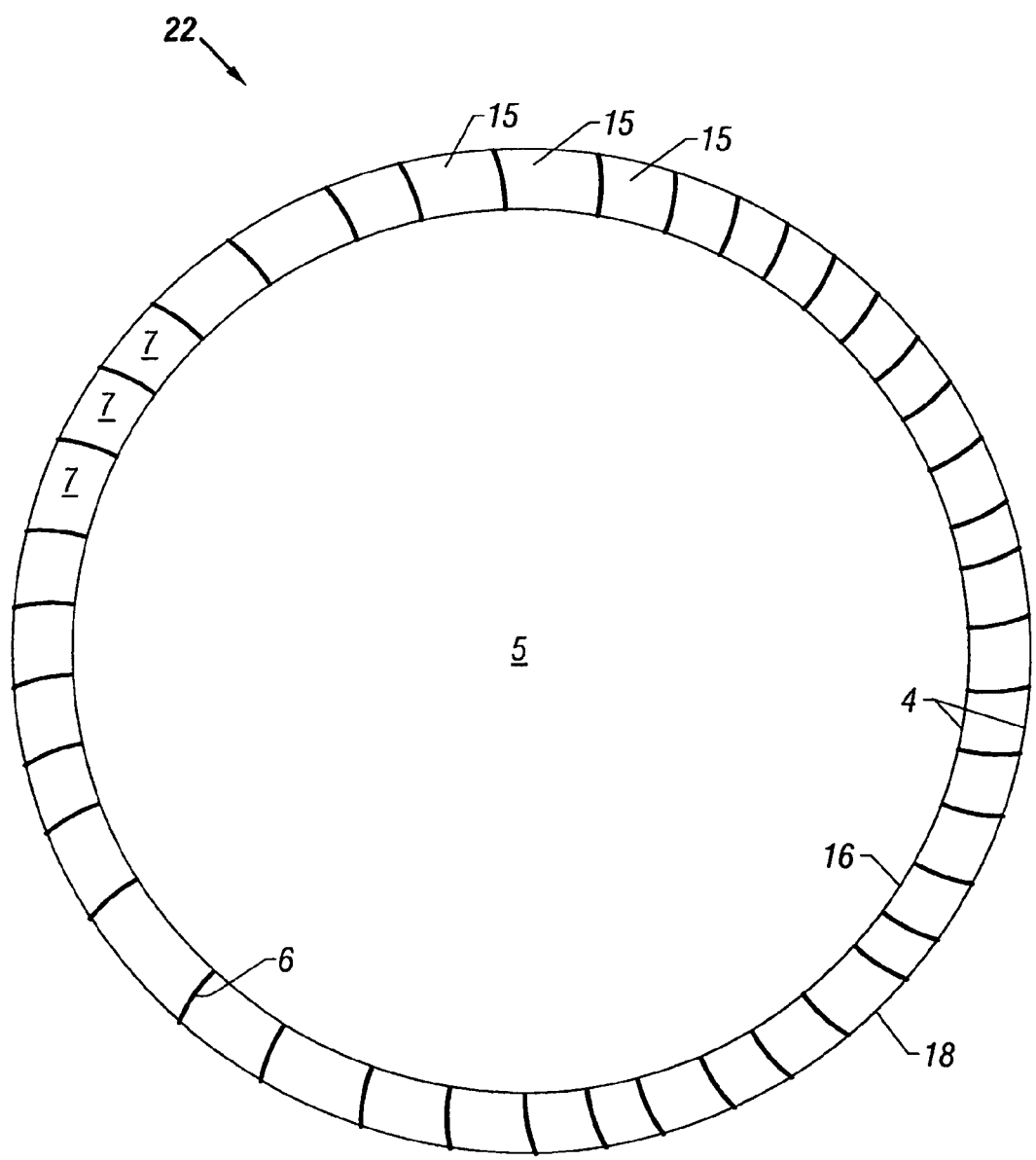
FIG. 5A depicts a conduit lining member in the inflated state with spacers that define channels running along the length of the conduit.
Figure 5B:
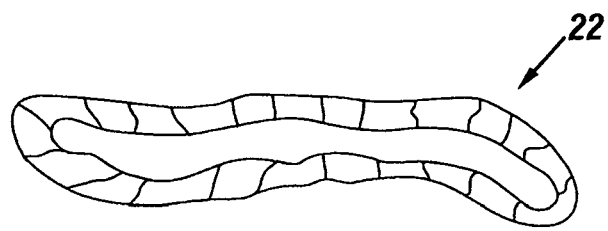
FIG. 5B depicts the conduit member of FIG. 5A in a partially inflated state.

FIG. 5A depicts an alternate embodiment of a conduit lining member 22 in which the spacers 6 are seams that run between the preliner and compression liner. The conduit lining member 22 can be inflated in more than one way. "Inflation" as used herein is taken to include, among other things, processes where a substantially flexible or flexible object is filled or pressurized to cause it to expand, assume a given shape, or change shape, etc. First, the internal bore or lumen 5 formed by the compression liner may be inflated with a fluid such as air or water to expand the conduit lining member against the wall of the host conduit 2. Second, the enclosure 7 formed between the preliner and the compression liner is inflatable to form and/or expand channels 15 that are formed between spacers 6 (e.g., seams). The channels 15 can be isolated from one another, or optionally, openings in the walls of the spacers may create communication passageways between the channels 15. The channels 15 preferably create compartments that prevent, inhibit, and/or slow the flow of curable material toward the bottom of the conduit 2 due to gravity. In this manner, slump can be prevented or inhibited, even in embodiments where the viscosity of the curable material is relatively low. Finally, in some embodiments (such as when one or more of the spacers are a hollow rib), the spacers themselves may be inflated, e.g., to alter the width and/or height of the enclosure between the preliner and the compression liner. Inflation will be discussed in further detail below. The conduit lining member 22 is preferably sufficiently flexible to be flattened and/or rolled up prior to being installed and inflated. A partially inflated conduit lining member is depicted in FIG. 5B.

Figure 6:
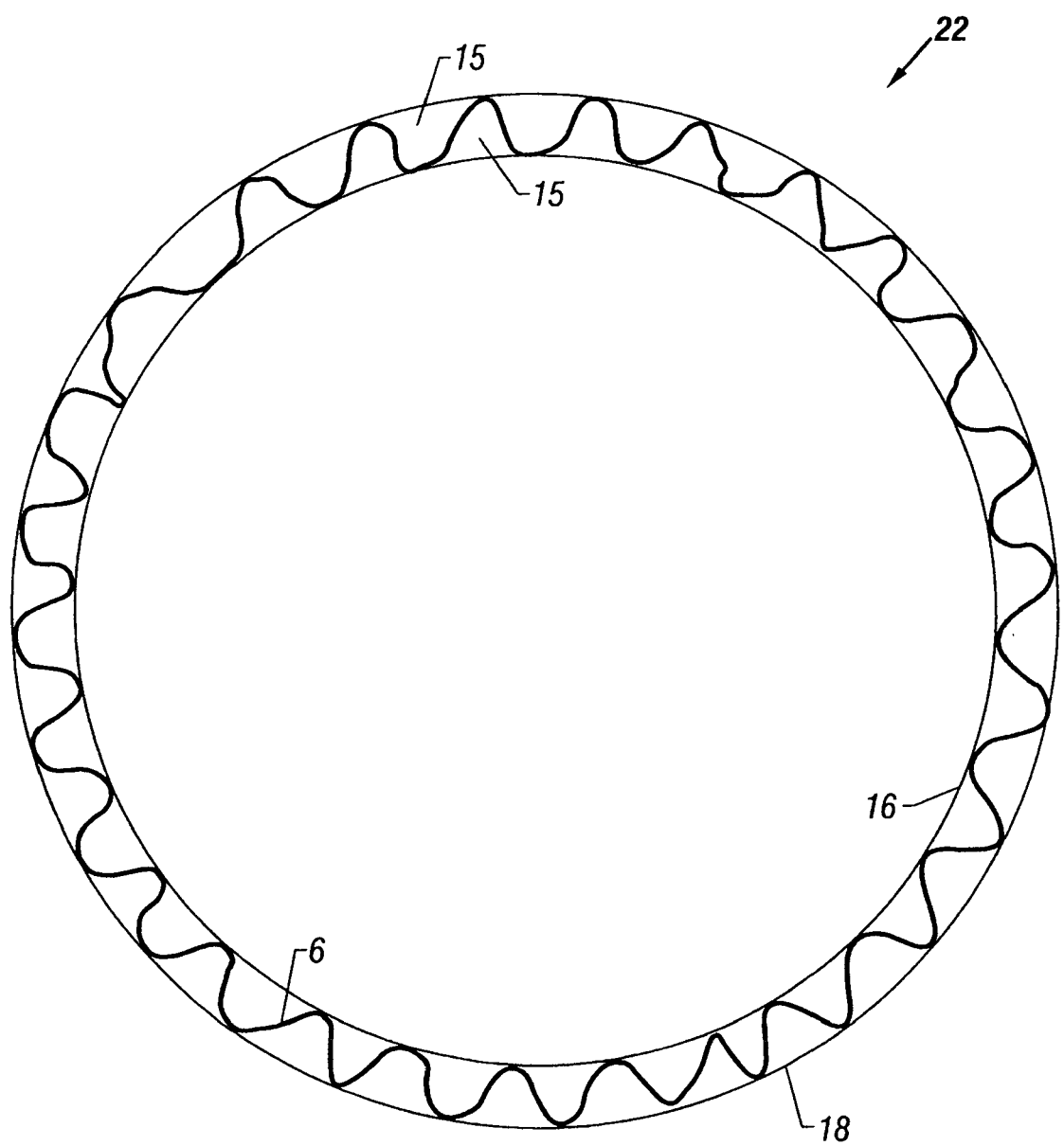
FIG. 6 depicts a conduit lining member with spacers formed from corrugations in the liner material.

FIG. 6 depicts an alternate embodiment of a conduit lining member 22 in which the spacers are seams having the shape of corrugations that run between the preliner and the compression liner. The cross section of the conduit lining member may have the appearance of a cross section of linerboard or a corrugated box. The majority of the channels 15 are preferably filled with curable material, with one or more channels preferably left open for use as a communication channel. The corrugations can have openings to allow fluid and/or resin to pass laterally from channel to channel. In one embodiment, the openings in the spacers 6 (e.g., ribs, corrugations, seams) are sufficiently small to permit air to pass from channel to channel while substantially inhibiting the flow of curable material from channel to channel.

Figure 7:
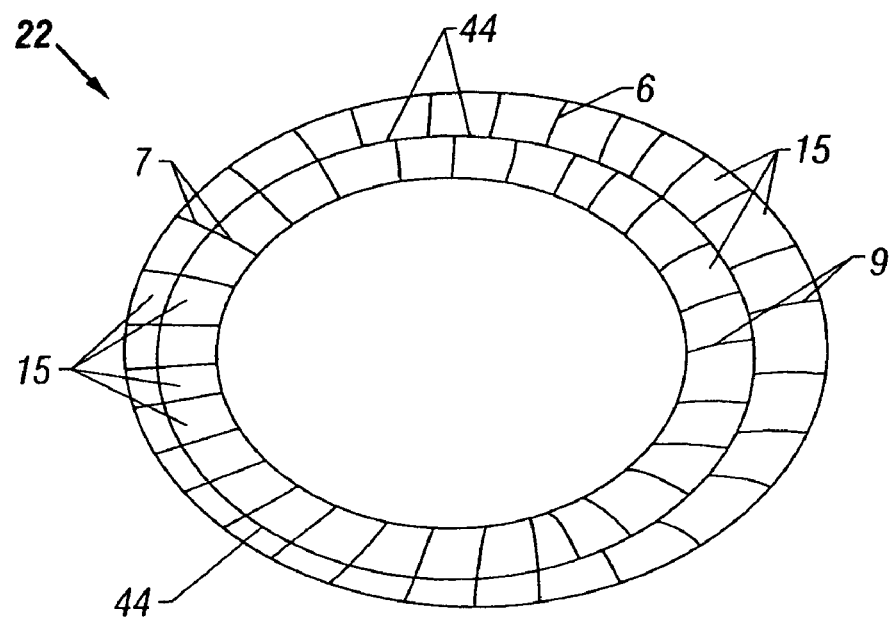
FIG. 7 depicts a conduit lining member with multiple layers of spacers.

FIG. 7 depicts an alternative embodiment of conduit lining member 22 containing two or more levels or rows of spacers 6 and channels 15. The rows of channels can be separate enclosures that are defined by interior liner 44. In this manner, two or more enclosures can be created that contain different pressures of fluid. The fluid pressure in each enclosure preferably determines the width and/or height of the enclosure and thus the ultimate width and height of the newly formed liner material. Each enclosure is preferably divided circumferentially by seams or another type of spacer (e.g., ribs, corrugations, etc.) to form a number of channels. The spacers (and channels) may be regimented (i.e., lined up) as illustrated by seams 7, or the spacers may be staggered as illustrated by seams 9 to increase the strength of the member 22 and the maximum pressure that its enclosures and channels can contain. In one embodiment, interior liner 44 contains openings or passageways to allow communication between the enclosures in the manner described above for the channels 15. Multiple rows of spacers and channels are especially useful for applications involving large diameter conduits. For instance, more some sewers have widths or diameters of that are about 30–40 feet, and it may be advantageous to use a lining member that contains three or four (or more) rows of enclosures having spacers and channels, which can be staggered to increase the strength characteristics of the newly formed liner.

The geometries for spacers 6 shown in FIGS. 4–7 are merely illustrative. It is to be appreciated by those skilled in the art with the benefit of the description herein that spacers having a variety of other geometries can be used in the present invention.

In sewer applications, the lining member preferably has a length that is sufficient to extend from manhole to manhole. In such cases, the lining member has a length that is preferably greater than about 100 feet, more preferably between about 100 feet and about 400 feet, and more preferably still between about 300 feet and about 400 feet. The lining member is preferably rollable or foldable (e.g., compressible like an accordian) to facilitate transport prior to its installation within the host conduit.

The spacers 6 may be used to calibrate the wall thickness of the newly formed liner. The spacers are preferably ribs having a selected width, height, and/or diameter and can be used to calibrate the wall thickness of the conduit lining by creating a selected liner thickness or spacing 12 around the perimeter of the inner surface of conduit 2. The spacers 6 can define the separation between liner material 4 and the host conduit 2 as depicted in FIG. 1. The spacing can be predetermined according to factors such as the diameter of the host conduit, the degree of deterioration of the host conduit, the pressure of the fluid typically transported within the pipe, and the desired strength of the newly formed liner. For example, for some host conduits having a nominal diameter of 8 inches, the selected spacing 12 is preferably preselected in the range of less than about an inch, more preferably between about ⅛ of an inch and about ½ of an inch, and more preferably still about ¼ of an inch.

Figure 8:
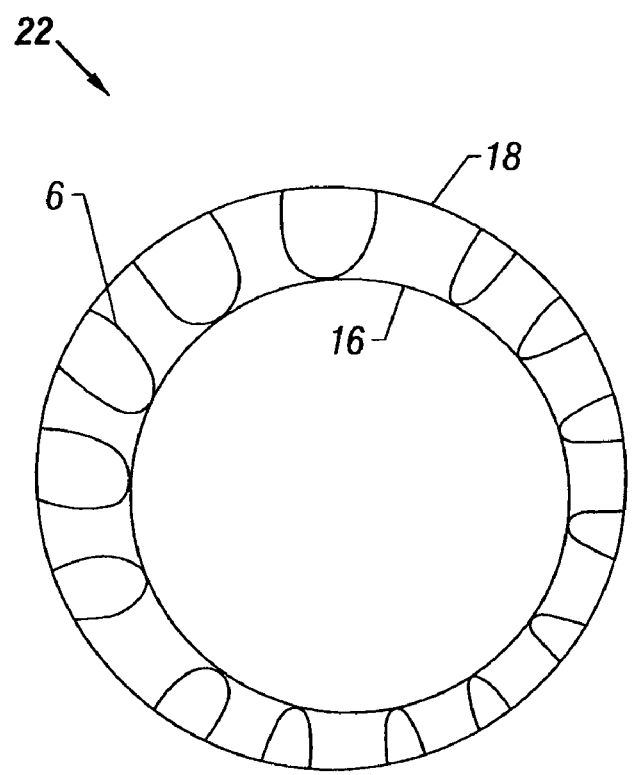
FIG. 8 depicts a conduit lining member with spacers of varying sizes.

The selected spacing 12 may be uniform or substantially uniform around the perimeter of the conduit 2, or it may be thicker in certain areas that are more susceptible or vulnerable to deterioration as depicted in FIG. 8. If additional thickness is needed in a particular area of the pipe, the spacers may be increased in size for that area to provide additional thickness. In many pipe systems, for example, the top of the pipe is an area that needs additional liner wall thickness because that area encounters the most severe operating and environmental conditions. Therefore, relatively thicker ribs or spacers can be employed in the top portion of the host conduit 2 in order to create a thicker lining at that location.

One or more of the spacers 6 may be hollow to form an open bore or channel 15 in a direction along the length of conduit 2. The channels preferably extend continuously through the length of the newly formed conduit liner. The channel 15 may have a substantially tube-like shape. The hollow spacers 6 are preferably adapted to contain a wire, fiber, or cable such as fiber optic cable or any other wire for transmitting electronic signals. Such communication channels may be used for leak detection systems to monitor the host conduit as well as applications that are unrelated to the host conduit. For instance, the communication channels may be useful for installing fiber optic cable and/or telephone lines while a sewer line is being repaired. The use of one or more hollow, flexible, or flaccid spacers allows wire, fiber optic cable, metal cable, and other communication devices to be inserted through the spacer lengthwise. Instruments to monitor the condition of the host conduit, the liner, the environment, leak detection, or pressure changes may be housed within these spacers or ribs or within channels formed between the spacers. In this manner, a low-cost method of "wiring" or tying communications channels together is provided using the hollow spacers within or attached to the newly formed liner. Alternatively, the hollow spacers 6 or channels 15 may also be filled with curable material to create a filled spacer 14. The communication channels may be interior to or exterior to the preliner (i.e., on either side of the preliner relative to the host conduit).

Figure 9A:
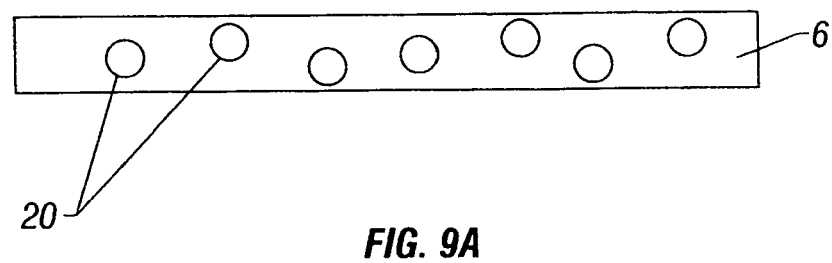
FIG. 9A depicts a side view of a rib containing several openings.
Figure 9B:
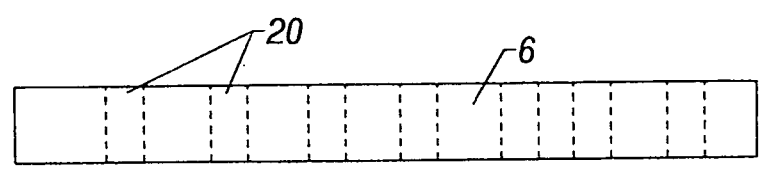
FIG. 9B depicts a top view of the rib from FIG. 9A.

The spacers may have one or more openings 20 or indentions in them as illustrated in FIG. 9A and FIG. 9B. FIG. 9 is a side view of a cylindrical spacer and FIG. 9B is a top view of the same. The openings or indentions 20 may be spaced apart either uniformly or randomly. The openings 20 may be positioned to create a "swiss cheese" configuration in the spacer. These openings or indentions preferably allow the curable material to pass through and fill any voids in the spacers. The structural strength of the newly formed liner may be enhanced by locating openings 20 in selected or random locations and curing curable material therein to create a mesh, lattice, or basket-weave type structure. When the spacers are hollow or otherwise have voids in them, these voids may be filled or partially filled after being placed in the host conduit by use of a vacuum, pressure, or a combination of vacuum and pressure to draw curable material into the voids. The voids may be filled before or after the inflation of the compression liner and the introduction of the curable material. Upon curing, the curable material helps form a monolithic structure of the new pipe within the host conduit.

An alternative way to calibrate the liner wall thickness is by using inflatable spacers and/or an inflatable enclosure within a conduit lining member. In one embodiment, the spacers 6 or channels 15 can be inflated by a gas or liquid to varying degrees up to a maximum hoop dimension of the spacer and/or enclosure. In one embodiment, the spacers and/or enclosure are inflated with the curable material used to form the new conduit liner. Inflatable spacers and channels preferably have a thickness that can be selectively varied based upon the amount of fluid introduced into the interior of the spacer or channel and the resulting pressure. In this manner, the thickness of the conduit liner can be controlled and varied by selective inflation or deflation of the spacers and or channels. In one embodiment, the spacers or channels internally communicate with one another through openings 20 and can be simultaneously inflated by directing gas or liquid into one of the spacers. In another embodiment, the spacers or channels do not internally communicate and can be inflated separately. In addition, the thickness of the spacers or channels (and thus the ultimate thickness of the conduit lining) can preferably be adjusted by inflating or deflating the spacers or channels after the liner material and spacers have been positioned within conduit 2 but prior to curing the liner material into place within conduit 2. The spacers or channels are preferably inflated to an internal pressure of between about 1 psig and about 20 psig, more preferably between about 3 psig and about 15 psig, and more preferably still to between about 5 psig and about 10 psig.

The internal pressure of the spacers is preferably greater than the pressure used to inflate the bore of the compression liner. In this manner, the pressure within the internal bore of the compression liner will tend to not deform the shape of the channels or hollow spacers in the enclosure that are separately inflated. In addition, in cases where channels or hollow spacers are to be left empty of curable material so that they can be used to house cable or other communication devices, such "communication channels" are preferably inflated to a pressure slightly greater than that of the channels or spacers filled with curable material. For example, in one embodiment the compression liner bore is pressurized with air to about 4 psig, the channels containing curable material are pressurized with curable material to about 5 psig, and a communication channel is pressurized with air to about 6 psig.

In one embodiment of the invention, the liner is flaccid or flexible and the spacer 6 or channel 15 is capable of being inflated with a gas or liquid such as air or water. The inflatable spacers or channels may be inflated to different degrees such that the spacer or channel is in a substantially-inflated state or a fully-inflated state. The spacer or liner material is preferably substantially rigid when fully inflated. The degree of rigidity of the spacer or liner material will generally depend upon its internal pressure and the external pressure applied. As an example, if a spacer is inflated to an internal pressure of 5 pounds psig, the spacer will tend to remain somewhat rigid until subject to an external pressure greater than 5 pounds psig. In one embodiment, the spacers or channels are constructed to expand, when inflated, to the predetermined thickness of the wall of the new cured-in-place liner.

Figure 10:
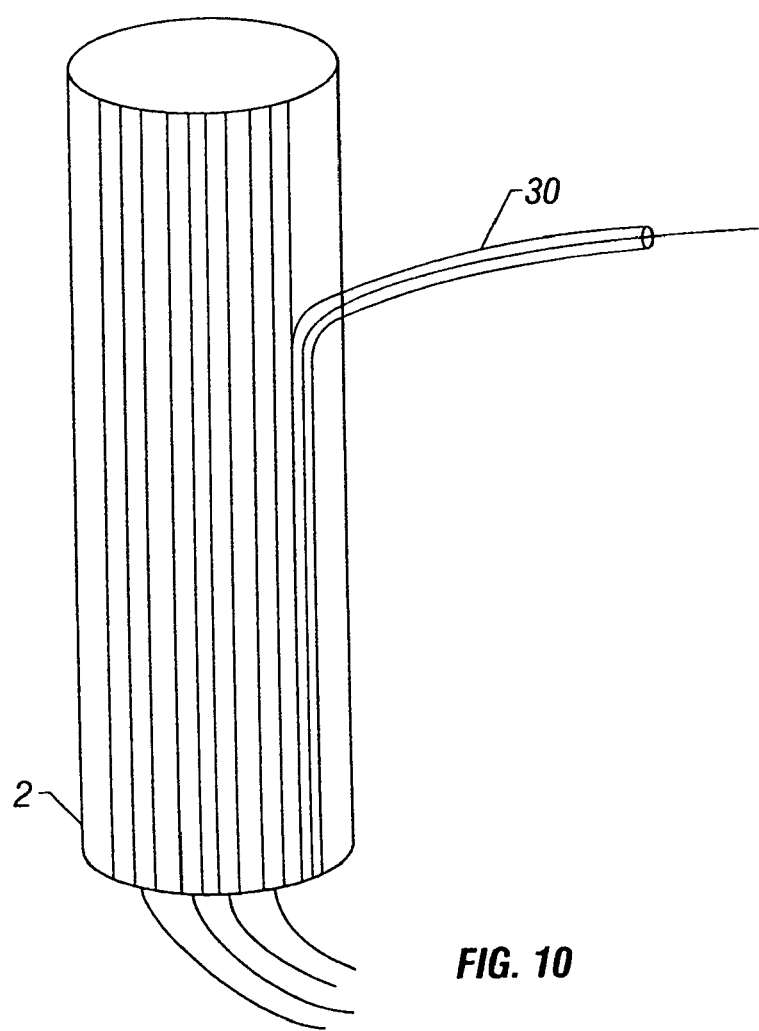
FIG. 10 depicts an independent spacer.

A spacer 6 may be used alone or in combination with other spacers. As depicted in FIG. 10, one example of an independent spacer 30 or rib is one that branches off or diverges from the main liner material 4 and is capable of being pulled into a lateral pipe or manhole or other area. An independent spacer or rib may be designed specifically to house devices so that it can be used by itself to create a communication pathway for fiber, cable, wire, or other devices. An independent or stand-alone spacer or rib can be used to install fiber in a pipe that is not in need of structural repair. An independent spacer or rib may also be encased in a conduit such as a flexible metal conduit to protect the channel in areas such as locations near a manhole. Where a spacer is independent of any attachment to liner material, it can be inserted as a separate part into the host conduit 2 and may be inserted directly against the host conduit wall. Alternately, an independent spacer can be inserted into the host conduit adjacent to a preliner after the preliner has been positioned against the host conduit wall.

Figure 11A:
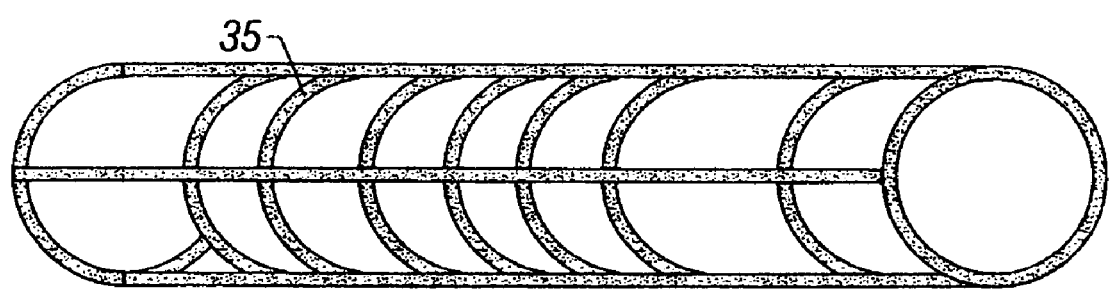
FIG. 11A depicts a support member and a conduit lining member having support members running between the spacers.
Figure 11B:
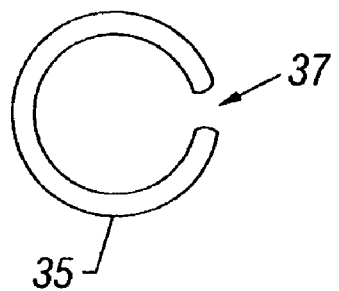
FIG. 11B is a side view of a support member.
Figure 11C:
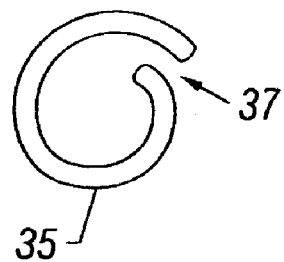
FIG. 11C is a side view of a support member.

An independent spacer may be supported by a support member 35 to hold it into place in the conduit as depicted in FIGS. 11A, 11B, and 11C. Support members can be used to add structural strength to the newly formed liner and to hold spacers in an appropriate spacing relative to one another. The support members are preferably connected to spacers 6 at a substantially perpendicular angle and run between the spacers. The support members will often be smaller in cross section than the longitudinal spacers to allow liquids to move down the length of the pipe in order to equalize the thickness of the curable material adjacent to the wall of the host conduit. In some cases, however, the longitudinal spacers and the support members can have widths or cross-sections that are approximately the same size. The support members can have openings passing through them to allow curable material to pass through them and move down the length of the pipe. The support members can be circular ribs that are sued in conjunction with either the compression liner or the preliner.

In one embodiment of the invention, the support member is a rib having a circular shape that is sized to snugly fit around the inner circumference of the host conduit. The support ribs may contain a gap 37 such that they are not completely joined around their perimeter or circumference. Gap 37 allows the ribs can be compressed or rolled to facilitate insertion into the host conduit 2. When the compression liner is inflated during installation of the new liner, the compressive force exerted by wall of the compression liner preferably expands the circular ribs against the wall of the host conduit (or against any liner material between the circular ribs and the host conduit) to help fix the circular ribs in place. Alternatively, the support members can have a cross section without a gap on its edge to form a complete, continuous perimeter.

The communication channels 15 created in the newly formed liner can be used to house another hollow pipe member or hollow rib that is pulled or snaked through the channel from one end of the tube to another. In one embodiment, a rib or hollow pipe member is inserted into a channel 15 to alter the properties of the inner surface of the channel. For instance, a rigid or flexible rib may be inserted into a channel to create a more rigid or flexible surface for housing a communication device. This allows a channel to be further lined with an additional material or pipe having properties different than those of the cured curable material or the spacers contained in the host conduit. The hollow pipe member or hollow rib may be used to provide additional protection to the cable, fiber, or other communication device that is inserted into the communication channel. For instance, curable material such as synthetic resin or cement may be hard or brittle, whereas the hollow pipe member can contain a flexible and/or soft lining to create a cushion-like surface that will help protect the fiber optic cables or other communication cables.

Figure 12:
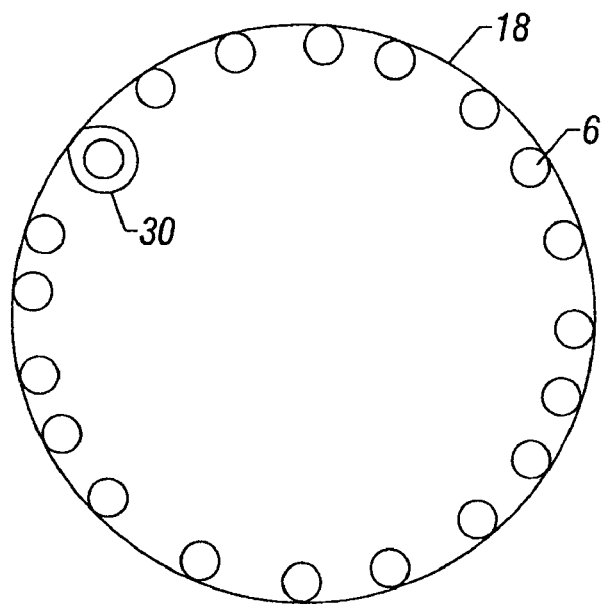
FIG. 12 depicts a preliner with spacers formed on its inner surface.
Figure 13:
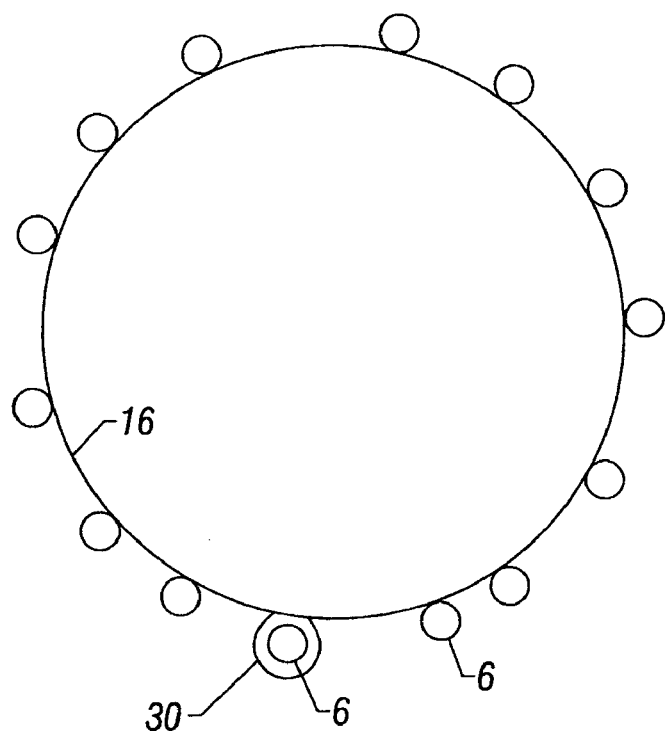
FIG. 13 depicts a compression liner with spacers formed on its outer surface.

In one embodiment of the invention, the spacers may be integral to (or form part of) either the compression tubes or preliner tubes or both. The spacers may optionally be fused, bonded, sewn, or formed onto the liner material. The spacers may be attached to (or formed on) the preliner or the compression liner tube either on either the inside surface or the outside surface of either type of liner. For example, spacers 6 can be formed onto a preliner 18 lying adjacent to the wall of the host conduit as shown in FIG. 12. Alternatively, spacers can be formed onto the compression liner 16 that is either inverted or pulled through the preliner as shown in FIG. 13. Each liner or tube is preferably designed of material to allow enough radial stretch in the hoop direction to allow the lines material to fit tightly against the host conduit regardless of whether the spacers are located inside or outside of either liner or tube. In one embodiment, a liner is constructed with spacers formed on its inner or outer surface so that it can subsequently be used as either a preliner tube or an inner compression tube.

The liner material may be a compression liner with a plurality of spacers formed on its outers surface as shown in FIG. 13. The compression liner can be sized so that, upon inflation of its lumen or central bore, the spacers are compressed against the inner wall of the host conduit. By pressing the spacers against the wall of the host conduit, channels can be formed between the void between each adjacent spacer and the inner surface of the host conduit. In this manner, continuous channels running along the length of the host conduit can be formed by using a compression liner and protruding spacers, without the need for a preliner. Optionally, the compression liner may be sufficiently flexible that it stretches between the voids formed between the spacers to a selected degree depending upon the pressure within the inflatable compression liner. The spacers can have a geometry (e.g., rectangular cross section) so that the top of the spacer is substantially flat to mate with the inner surface of the host conduit, and the spacers may be hollow to create a communication channel and may be separately inflatable (e.g., adapted to change shape or form into a selected shape in response to a change in internal pressure).

The spacers 6 preferably run in a direction parallel to the host conduit. These spacers or ribs may be hollow or optionally may be solid. There may be a combination of hollow and solid spacers or ribs in a single liner. Generally, there will be more than one spacer or rib attached to the liner (unless, e.g., a rib is used alone to insert a communication channel into the host conduit), and the spacers may have widths, heights, or diameters that are the same. Optionally, the widths, heights, and/or diameters of the spacers may vary around the perimeter of the lining member.

Figure 14:
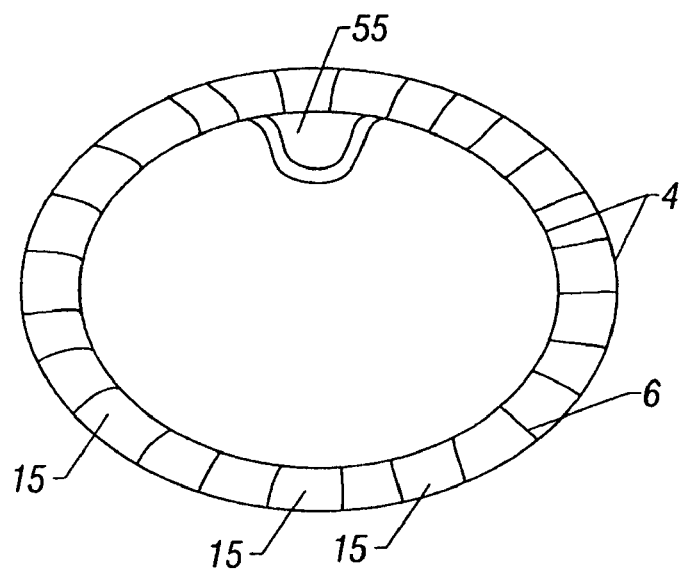
FIG. 14 depicts a hanging channel positioned on the interior of the liner material.

FIG. 14 depicts a hanging channel 55 positioned on the interior of the liner material. The hanging channel is preferably formed onto or attached to the inner surface of the liner material 4 (e.g., the compression liner). Hanging channel 55 is preferably made of a plastic material that forms a bore running along the length of the tube for housing a communication device such as a wire for transmitting electronic signals, a cable, a fiber optic cable, a power line, a telephone line, etc. The hanging channel provides an alternate or additional communication channel in cases where most or all of channels 15 are filled with curable material such as, e.g., when the host conduit 2 is substantially deteriorated and most or all of channels 15 need to be filled with curable material to add structural strength to the newly formed liner.

Figure 15A:
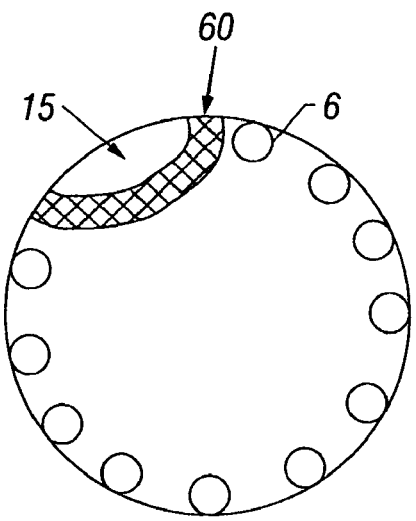
FIG. 15A depicts a conduit lining member having a mesh-reinforced communication channel.
Figure 15B:
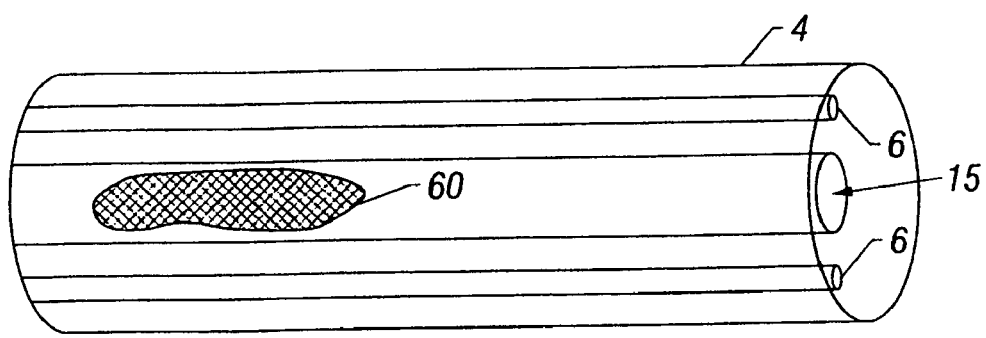
FIG. 15B depicts cut-away view of a mesh-reinforced communication channel.

In an embodiment depicted in FIG. 15A, a mesh 60 is placed into one or more of the communication channels 15 (e.g., hollow rib) to reinforce the channel to increase its strength in cases, e.g., where the curable material is introduced into the channel or when a sensitive communication device is housed within the channel. The mesh 60 may be created from fibers made of plastic, fiberglass, metal, Kevlar®, or any other suitable material capable of reinforcing the channel.

Alternatively, the mesh 60 may be incorporated into the lining member in order to improve the strength characteristics of the cured-in-place liner in applications where the host conduit will contain elevated pressures within the newly formed liner. The mesh 60 is preferably located between preliner 18 and compression liner 16. In one embodiment, the mesh 60 is located between multiple rows of spacers (as depicted in FIG. 7), and the mesh 60 may function as interior liner 44 to separate the multiple enclosures. The mesh may be installed into the host conduit simultaneously with the liner material and/or lining member, or alternatively, the mesh may be installed within the liner material after the liner material has been positioned within the host conduit.

It is believed that reinforcing a mesh 60 that is located within or adjacent to the liner material will facilitate the distribution of internal pressure over a wider surface area to prevent or inhibit the development of small holes in the liner due to elevated pressures. For example, reinforcing mesh 60 will preferably enable the liner to be continuously pressurized in excess of about 60 psig, more preferably in excess of about 90 psig, and more preferably still in excess of about 130 psig without the formation of pinholes or other small holes in the formed liner.

In one embodiment of the invention, curable material 10 is passed through the liner material (e.g., preliner 18) in order to repair cracks in conduit 2 or fill voids in the inner wall of conduit 2. Openings or slits in the liner material can be selectively placed near areas of conduit 2 to be repaired. The flow rate and amount of curable material 12 that is passed onto the inner surface of conduit 2 can be controlled by the size of the slits or openings and the inflating pressure that is used to press the liner material toward conduit 2. After curing, the curable material that has filled the voids and cracks in the host conduit will strengthen the host conduit 2 near the areas to be repaired.

The lining member 22 can be assembled by heat sealing sheets of plastic together. Methods similar to those used to make air mattresses can be used such as thermal or frequency welding, ultrasonic sealing, and vulcanization processes. Additionally, the inner sections of the lining member may be formed by using pressures and/or vacuums in a manner similar to that used for making PVC pipe sections. One supplier of liner materials that can be used in accordance with this description is Liner Products located at 1468 W. Hospital Rd., Paoli, Ind. 47454.

Figure 27:
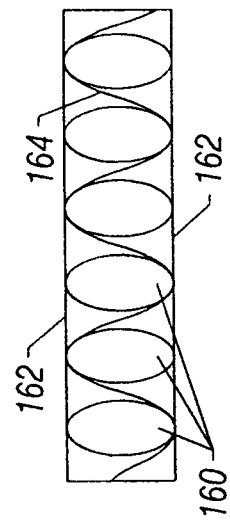
FIG. 27 depicts a jig and dowels used for making a lining member.

In one embodiment of the invention, a jig as depicted in FIG. 27 is assembled from flat boards and a number of dowels 160. A film or plastic layer 164 is positioned between each dowel 160 between plastic sheets 162. Sheets 162 and plastic layer 164 are preferably heat sealed together under conditions (depending upon the fusion properties of the plastic material employed) to form a tubular lining member containing a number of channels that are defined by the spacers (e.g., seams) formed by plastic layer 164. Spacers having a variety of geometries can be created in a similar manner as will be appreciated by those skilled in the art with the benefit of the description herein.

In one embodiment of the invention, an extruder can be used to make a plastic lining member with pre-formed channels located about its circumference that are substantially rigid and not inflatable. The channels may be formed with spacers therebetween to prevent curable material from passing between neighboring channels in order to inhibit slump during curing. In addition, fold-and-form technology may be used to create a pipe liner that is flattened, folded over, and inserted through the host conduit. Once inside the host conduit, the fold-and-form pipe can be expanded back to its original shape (when it was extruded) by using heat and pressure so that it fits up against the wall of the host conduit to serve as a new liner for the host conduit.

The liner material can be installed in a host conduit in a variety of ways. Typically, the liner material will either be inverted into the host conduit or pulled through the host conduit by methods known to those skilled in the art. In one embodiment, the compression liner and the preliner are installed separately into the host conduit. A preliner tube can be installed against the inner wall of the host conduit and then the compression liner can be inverted or pulled through the interior of the preliner tube. Curable material can then be introduced into the enclosure formed between the preliner and the compression liner.

In one embodiment of the invention, the channels formed within the enclosure between the preliner and compression liner permit curable material to be directly inserted within the channels. When a pull-through method of installation is used, the inner compression tube can be used to squeeze the curable material against the host conduit and the preliner. The curable material can be placed into the spacing between the preliner tube and the compression liner after the compression liner has been inserted into the host conduit but before the internal bore of the compression liner has been inflated, which can be accomplished by introducing gas or liquid into the internal bore.

In an alternate embodiment of the invention, the compression liner (e.g., inner compression tube) is inverted into the host conduit and preliner. This method of inverting the tube will produce a similar effect as the pull-through method. That is, the inverted inner compression tube compresses towards the wall of the host conduit to create a spacing defined by the spacers that is located between the two tubes of liner material. The spacing will be formed between the spacers, which tend to hold the inner compression tube away from the wall of the host conduit and any preliner. The spacing can be squeezed full of curable material, which is cured along with the spacers, preliner, and compression liner to form the wall of the new cured-in-pipe created within the host conduit.

Alternatively, the curable material can be inserted into a first liner or tube (e.g., a preliner) and an inversion tube (e.g., a compression liner) may be inverted into the preliner to squeeze the curable material (e.g., liquids, slurries, etc.) against the wall of the preliner, which can be ribbed. In this manner, the ribs can act as a calibrating agent and set the thickness of the spacing between the preliner and the compression liner. The curable material can fill the space between the ribbed preliner and the calibrating compression liner, which will eventually form the new wall of the newly-cured pipe lining.

Alternatively, the preliner is not ribbed or channeled and the compression liner is ribbed or channeled. Regardless of whether the spacers are formed on the preliner or on the compression liner, the spacers can act to calibrate the thickness of the newly formed liner by maintaining a predetermined or selected spacing between the two tubes or liners (e.g., preliner and compression liner). This spacing can be filled with curable material that will cure to form part of the new liner within the host conduit or vessel.

In an embodiment of the invention, the preliner compression liner, and/or spacers may be pre-formed into a single-piece, unitary lining member. In this manner, the preliner, compression liner, and spacers can be inverted or pulled through the host conduit in a single step. The curable material may be introduced into the spacers and/or enclosure formed within the lining member during or after the lining member has been inserted into the host conduit.

During inflation of the compression liner, the compression liner (e.g., inner compression tube) is squeezed against the wall of the preliner and the host conduit. For example, in one embodiment fluid is introduced into the inner compression tube and the inner compression tube squeezes the outer surface of the compression tube toward the preliner tube and the host conduit wall. The spacers can be used to maintain a spacing between the inner compression tube and the outer surface of the compression tube so that the curable material can fill the space created between the tubes.

Figure 16:
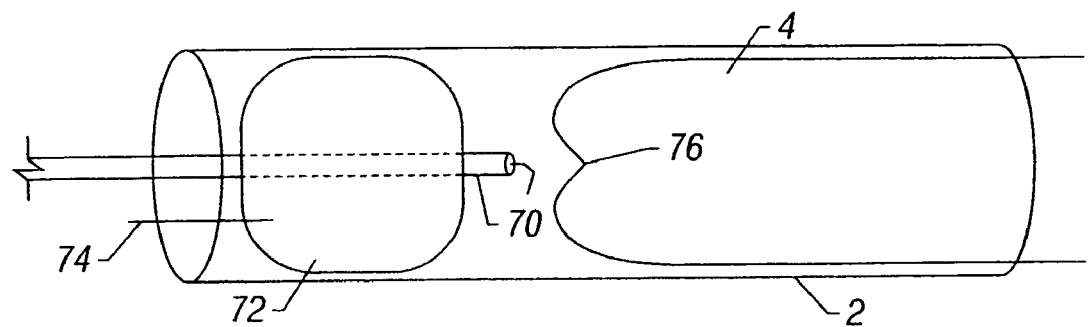
FIG. 16 depicts the introduction of curable material into a host conduit using a resin hose.

In one embodiment of the invention, the liner material is introduced through one end of the host conduit, while the curable material is introduced through the opposite end of the host conduit. When the compression liner is to be inverted into the preliner and host conduit, the introduction of curable material may be accomplished by using a hose 70 having one of its ends attached to one end of a pig-like device 72 and pull line 74 as depicted in FIG. 16. The other end of the hose can be attached to a reservoir of curable material. The curable material can be forced into the space in front of the inverting compression liner near the inverting compression tube head 76, and the curable material is squeezed into the voids or spaces located between the spacers due to the design and arrangement of the spacers, channels, inner compression liner tube, preliner, and/or support members.

Alternatively, the curable material can be introduced into the host conduit from the same end of the host conduit that the liner material is introduced into. When the compression liner is pulled through the host conduit, the curable material can be introduced by a hose attached to a reservoir, with the hose being pulled through the space between the preliner and the compression liner. As the hose is pulled through the space between the preliner and the compression liner, a measured amount of curable material is preferably discharged from the reservoir into the space between the preliner and the compression liner.

The reservoir containing the curable material is preferably located outside the host conduit, and the hose 70 preferably contains a regulator to enable the dispensing of a measured amount of curable material into the space between the compression liner and the preliner. The spacers help regulate the thickness of the newly formed liner in the host conduit. The hose preferably includes a nozzle that can be positioned at a variety of angles and adjusted to enable the curable material to be dispensed into desired areas near or on the liner material within the host conduit.

Figure 17:
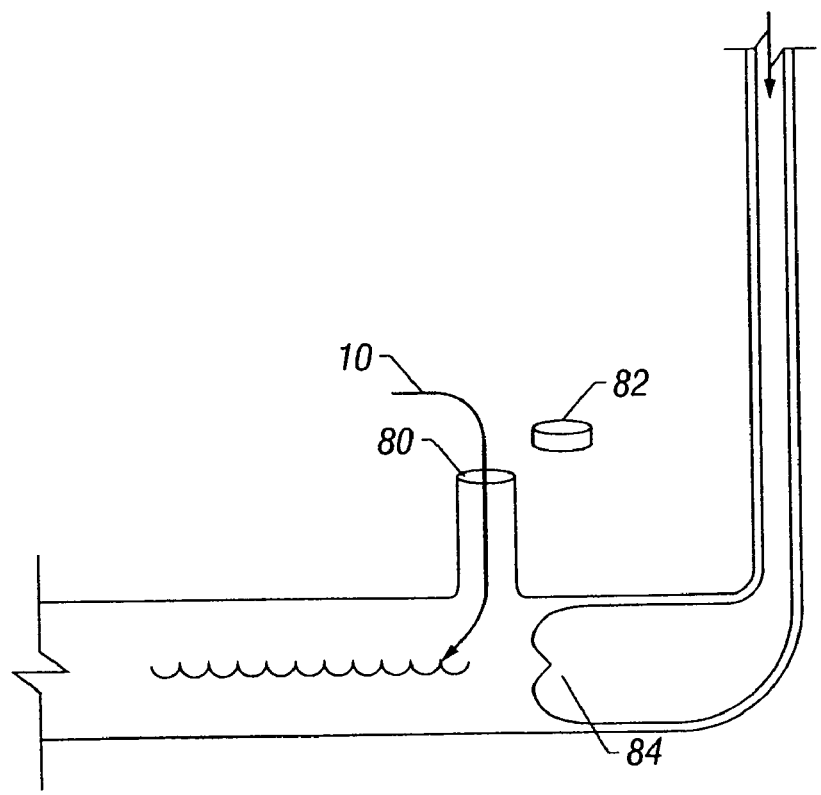
FIG. 17 depicts the introduction of curable material into the host conduit from the same end into which the liner material is introduced.

The curable material may be introduced into the host conduit from the same end into which the liner material (e.g. inverting compression liner 84) is introduced as depicted in FIG. 17. In this case, a measured amount of curable material can be dispensed into the host conduit through an opening 80 that leads into the host conduit. This opening 80 can be closed by filler cap 82 after the curable material 10 is dispensed into the host conduit.

Figure 18:
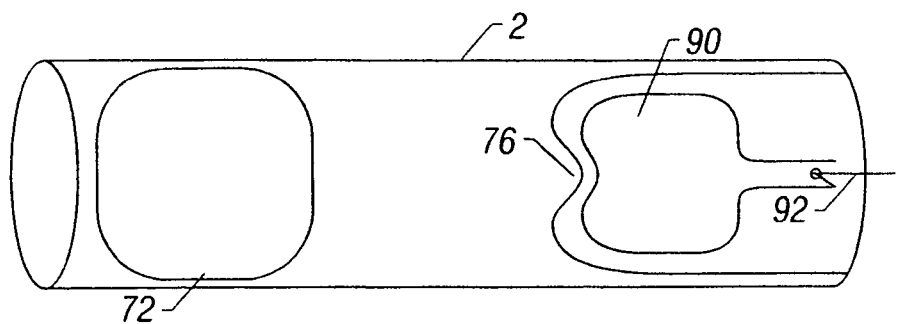
FIG. 18 depicts a funnel device used to facilitate inversion of the liner material into the host conduit.

In one embodiment of the invention, a smoothing device 90 or mandrel can be inserted into the interior of the host conduit near the inverting face of the compression liner head 76 as depicted in FIG. 18. This smoothing device 90 preferably has a tapered shape or a funnel shape and helps smooth the inner wall of the pipe lining as it is being formed to insure uniformity of the wall of the lining. The smoothing device preferably has a diameter that is substantially equal to the desired inner diameter of the newly formed liner, and the funnel or tapered shape facilitates insertion of the smoothing device into and through the liner material. When the smoothing device is passed through a lining member 22 it may force excess curable material out of channels or spacers that bulge toward the lumen of the lining member due to having been slightly overfilled with curable material. In addition, the smoothing device may be connected to a source of heat or ultraviolet light that is used to initiate and promote curing of the curable material. In this manner, the smoothing device can simultaneously promote curing and smooth the inner diameter of the new liner before the curable material has fully cured. The smoothing device can optionally contain a groove or cutout to accommodate devices extending from the inner surface of the lining member such as, e.g., a hanging channel as depicted in FIG. 14. The smoothing device can be attached to restraint line 92 and is removed after the liner material has been inserted and may be reused.

In one embodiment of the invention, a rope or tape may be attached to the inner surface of the liner material (e.g., the preliner, compression liner, etc.). This rope or tape can be fastened to both ends of the liner material. When it is necessary to pull a second tube through the compression liner or through the host conduit, the rope or tape can be removed from the ends of the liner material and attached to the second tube. The tape or rope can then be used to pull the second tube through the host conduit. Other devices may also be pulled into or through the pipe in this manner. A pull-tape or rope may also be inserted through one or more of the hollow, flexible, flaccid spacers, or channels to facilitate the pulling of cable, fibers, or other material through the spacers or channels along the length of the host conduit.

Figure 19:
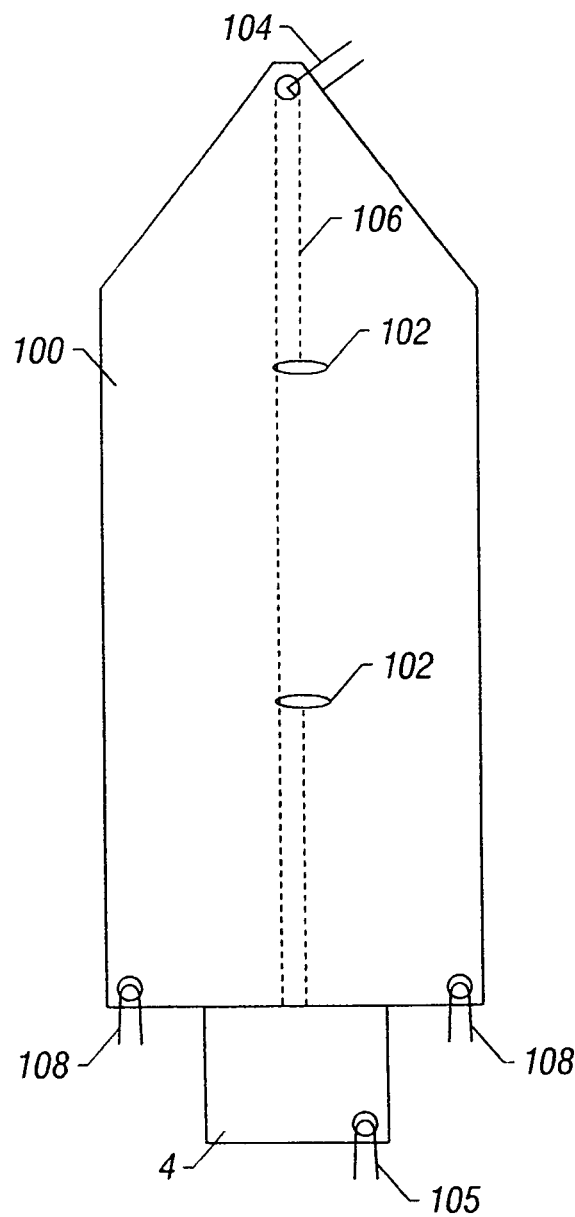
FIG. 19 depicts a sled bag for facilitating insertion of devices through the host conduit.

In one embodiment of the invention, a protective covering or sled bag 100 as depicted in FIG. 19 is used to move the liner material 4 (e.g., compression liner, preliner) or other tubes or devices through the host conduit to minimize the damage that can occur to the liner material 4 and tubes as they are positioned inside the host conduit. The sled bag 100 is preferably made of material that will resist tears as it passes through the host conduit. The sled bag can optionally have an overlap closure 106 with an opening that runs from its bottom to a location near its top. This opening can be closed with a zipper, Velcro closure, tie lines 102, or other similar methods. This opening allows materials such as liner material 4, tubes, or shunts to be more easily inserted into the sled bag before they are installed into the host conduit. The sled bag can have a variety of lengths, and its construction will depend upon the condition of the inner wall of the host conduit.

In one embodiment of the invention, the sled bag 100 is placed near the entrance to the host conduit, and a liner material such as a preliner tube or compression liner tube is partially inserted into the sled bag. The liner material (e.g., a tubular lining member) may be folded or compressed into an accordian-like shape to enable it to be placed within the sled bag. The sled bag is then pulled through the host conduit and carries the liner material with it, while protecting the liner material from being pulled directly against the wall of the host conduit, which may contain obstructions, rough or sharp edges, or protrusions that could otherwise damage the liner material. The liner material contained within the sled bag can be slowly let out of the sled bag and deposited on the bottom of the host conduit as the sled bag is moved along the host conduit. One end of the liner material is preferably secured or anchored to one end of the host conduit by tie line 105. In this manner, the liner material will remain in place within the host conduit after the sled bag has passed through the entire host conduit.

The sled bag is preferably made of material such as canvas or plastic that allows the bag to be used a number of times. Alternately, the sled bag may be disposable, especially in cases where it is anticipated that pulling the sled bag through the host conduit may damage the sled bag, in which case, the bag can be designed for one-time or a limited number of uses to reduce costs. The sled bag should be sized to pass through the inner diameter of the opening through which it will be pulled. The sled bag may be coated with Teflon or a similar low-friction substance to facilitate its passage through the host conduit.

In one embodiment of the invention, stand-alone ribs facilitate insertion of calibrating spacers and support members into the host conduit. These stand-alone ribs are similar in construction to support members 35 depicted in FIG. 11 and can be compressed and then placed into the host conduit by the use of a sled bag 100 to protect the ribs from damage during the insertion into the host conduit. The stand-alone ribs can be compressed in the hoop direction to permit their insertion into a sled bag. The sled bag can then be pulled into the host conduit. The ribs may be placed partially inside the sled bag as it is pulled into the host conduit such that the trail end of the ribs extend outside the sled bag. After the stand-alone ribs are aligned in the desired location in the host conduit, the sled bag is pulled out of the host conduit, leaving the ribs inside the host conduit and allowing the ribs to expand to their original shape within the host conduit. A pull line 104 is preferably attached to the sled bag to enable the sled bag to be pulled through the host conduit. A restraint line may be attached to the rear of ribs to maintain the ribs in a desired location while they are separated from the sled bag. When the ribs are removed from the sled bag, the line attached to the rear of the ribs can be used to restrain the ribs in a selected position while the sled bag is pulled over the ribs and out of the host conduit.

Figure 20:
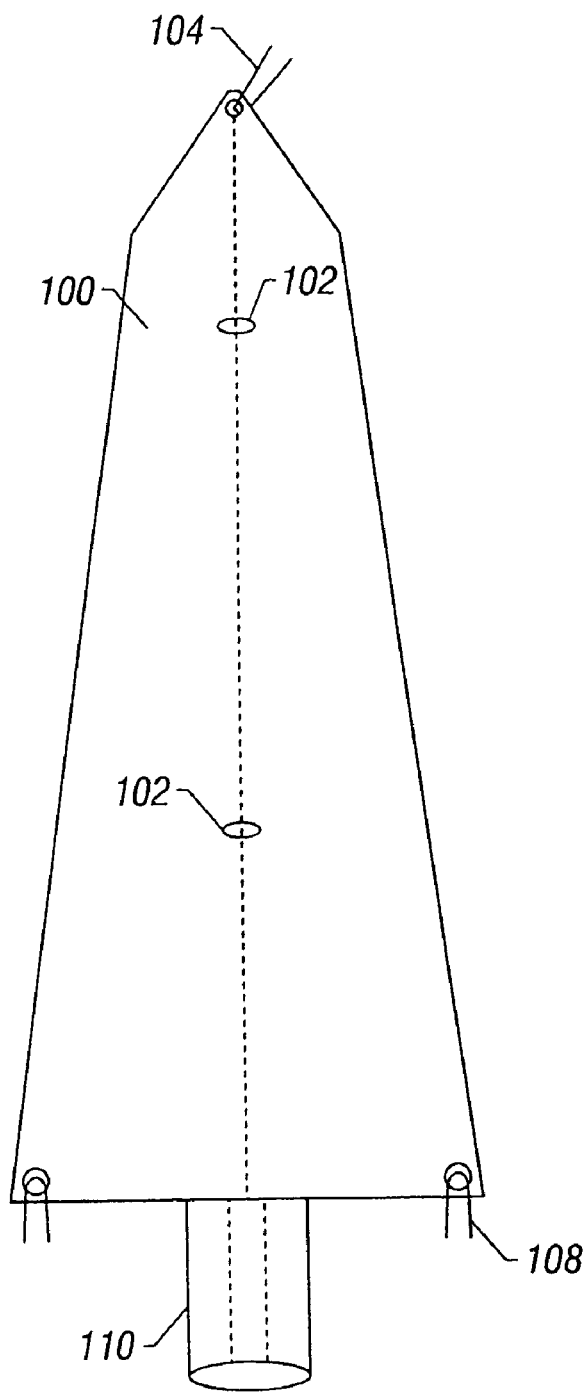
FIG. 20 depicts a sled bag containing a shunt insert for correcting an offset in a host conduit.
Figure 21:
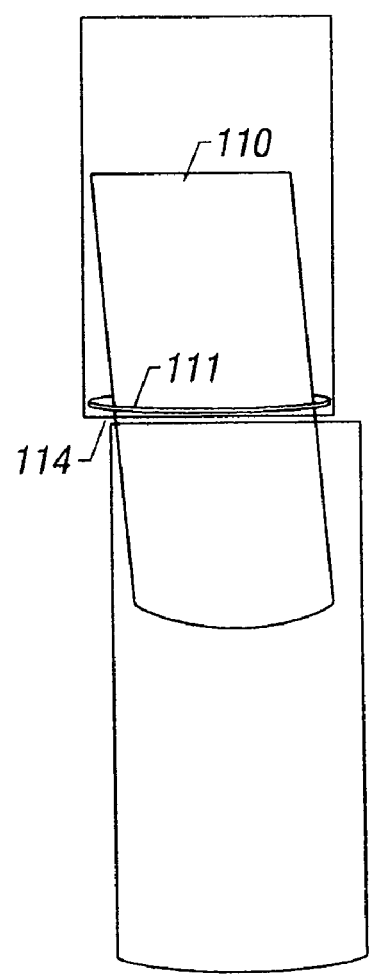
FIG. 21 depicts a shunt insert positioned adjacent to an offset in a host conduit.

FIG. 20 depicts a sled bag 100 containing an offset alignment device, stent, or shunt insert 110 for correcting an offset in a host conduit. In one embodiment, a shunt insert 110 as depicted in FIG. 21 is used to help control the thickness of the newly formed lining near an offset 114 in the host conduit. Offsets can tend to inhibit the alignment of the newly cured-in-place lining and may interfere with the installation of liner material through the host conduit, especially when the inversion method is used. These offsets usually occur where sections of the host conduit are out of alignment with the original line of the host conduit. The shunt insert bridges the two offset sections of pipe before the liner material is installed to create a smoother transition for liner material and/or other devices or materials that are passed through the host conduit. The shunt insert preferably prevents the misaligned section of pipe from cutting off or pinching channels formed in the liner material.

Figure 22A:
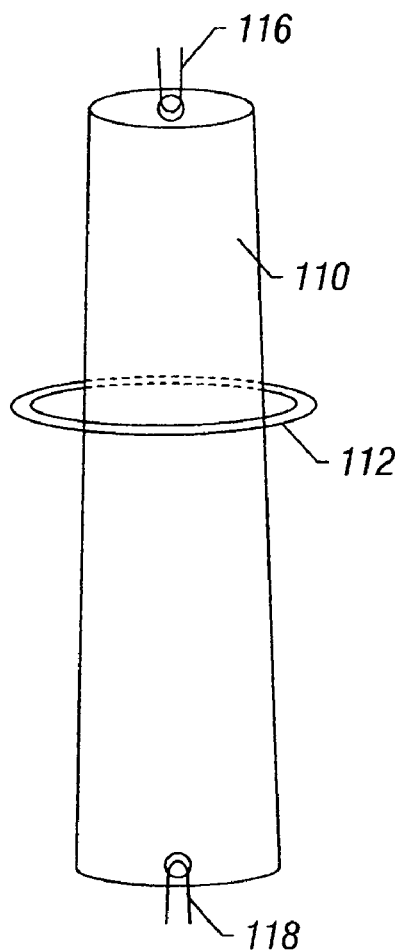
FIG. 22A depicts a shunt insert containing an external restraining rib.
Figure 22B:
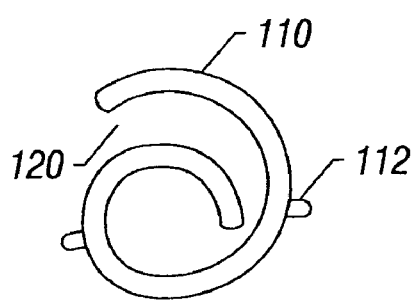
FIG. 22B depicts a cross-sectional view of a rollable shunt insert with a restraining rib.
Figure 22C:
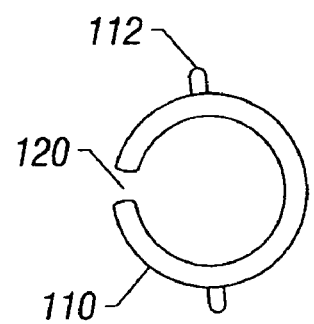
FIG. 22C depicts a cross-sectional view of a compressible shunt insert with a restraining rib.

The shunt 110 preferably has the shape of a pipe with an outside diameter that is slightly larger than the inside diameter of the host conduit. The shunt optionally has a lip on one or both of its sides to fit into the misalignment between the two sections of pipe. A restraining rib 112 as depicted in FIG. 22A is preferably formed around the outer circumference of the shunt. Cross sectional views of two embodiments of the shunt 110 are depicted in FIG. 22B and FIG. 22C. The shunt can be made of flexible plastic material and preferably has an opening or slit 120 along its length, which allows it to be radially compressed or partially-rolled lengthwise as in FIG. 22B to form a smaller diameter than that of the host conduit. The shunt can be placed into a sled bag that is tied to a line as depicted in FIG. 20. The line 104 can be pulled through the host conduit, which carries the sled bag through the host conduit. The sled bag preferably surrounds the shunt with a tight fit to maintain the compressive force on the shunt until it is removed from the sled bag. The shunt also preferably contains a line 118 attached to it for securing the shunt in place at a desired location within the host conduit. When the sled bag reaches the desired location within the host conduit, the line 118 that is attached to the end of the shunt is used to pull the shunt out of the sled bag. After the shunt is removed from the sled bag, it will expand to its natural shape and press against the wall of the host conduit because its natural, uncompressed diameter is slightly greater than that of the host conduit.

The line 118 can be fixed to the host conduit and the sled bag and can be pulled via line 104 to pull the shunt out of the sled bag at the location of the offset in the host conduit. The shunt is then positioned against the host conduit with the outer rib or lip 111 of the shunt inhibiting further passage of the shunt through the host conduit because of the interference fit created adjacent to the offset in the host conduit as depicted in FIG. 21.

The shunt preferably has lines 116 and 118 attached to each of its ends. In this manner, positioning of the shunt at the location of the offset 114 is made easier because the shunt may be pulled backward or forward using the two lines. After the shunt is positioned at the desired location, the lines attached to the shunt are removed and pulled out of the host conduit. The sled bag is then pulled on through the other end of the host conduit.

In situations where there is more than one offset area in the host conduit, a series of shunts and sled bags may be lined up in tandem and successive shunts can be put into place. The shunts are preferably made of a plastic or fiberglass material that is compatible with other components in the newly formed liner.

In an alternate embodiment of the invention, a communication channel can be formed in the host conduit adjacent to the liner material 4 by using a wire that is coated with wax along its length. The wire may be copper or another type of flexible wire that is coated with wax and is positioned into and through the length of the host conduit. The wax preferably has a melting point that is higher than the exothermic curing temperature of the curable material. After the liner material is cured into place within the host conduit, the wire may be heated to melt the wax, which facilitates attachment of the wax and liner material 4. After the wax has melted, the wire can be pulled out of the host conduit, leaving a passage running the length of the pipe that can serve as a communication channel for cable or other communication devices. The wire that is used to heat the wax may also be used to pull cable, fiber, or other material through the channel during removal of the wire from the host conduit.

In one embodiment of the invention, a liner can be inserted within the host conduit without the need for curing. The liner material in such a case preferably has a substantially cylindrical shape and is substantially flexible. The liner material preferably has a slit or gap that runs axially along its surface in order to allow the liner material to be compressed or partially rolled to decrease the diameter of the liner material to permit it to be inserted into the host conduit. In an uncompressed state, the liner material preferably has a diameter that is slightly larger than that of the host conduit. The liner may include a plurality of spacers protruding from its outer surface that will be pressed against the inner wall of the host conduit when the liner is expanded. The liner may also include pre-formed communication channels running along its length.

To install the "no cure" liner, a compressive force can be exerted upon the liner to reduce its width. The liner may be inserted into a sled bag to maintain the compressive force on the liner during installation. The liner is preferably pulled via a pull line into the host conduit to a desired location and the compressive force is removed (e.g., the liner is removed from the sled bag) to cause the liner to expand to its natural hoop dimension. The expansion of the liner preferably fixes it into place within the host conduit because the liner has a slightly larger diameter than the host conduit when no compressive force is applied to the liner. This "no cure" liner is preferred in applications where only a portion of the host conduit has deteriorated or in cases where a communication device is being inserted into a host conduit that is not in need of repair. The slit in the liner is preferably positioned adjacent to a portion of the host conduit that is not in need of repair.

A lateral intercept liner can be used to form a new liner for a lateral pipe that branches off the host conduit. A lateral intercept liner splits off from the main liner repair of the host conduit into a lateral pipe opening that branches in a new direction or goes into a manhole or other area. The lateral intercept liner is a type of liner material 4 and can be a preliner, a compression liner, or a combination of liners that performs the function of both the preliner and compression liner.

Figure 23:
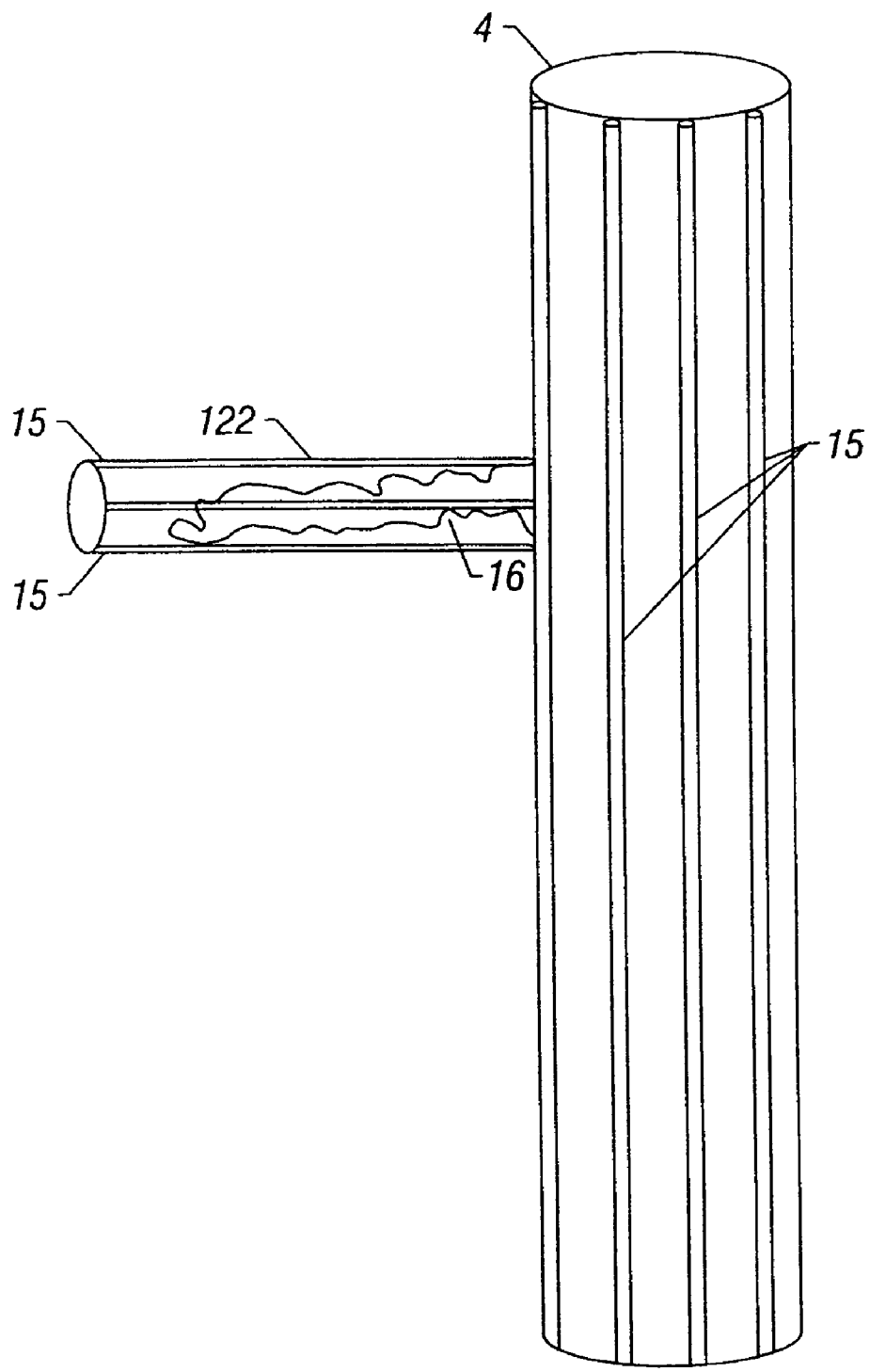
FIG. 23 depicts a lateral intercept liner in a lateral pipe attached to the host conduit.

FIG. 23 illustrates an embodiment wherein a lateral pipe is lined with a lateral intercept liner 122 that is attached to a preliner in the host conduit. Depicted in FIG. 23 is a liner material 4 that includes an inflated preliner having channels 15 and lateral intercept liner 122, which is inflated. Compression liner 16 is shown in the lateral intercept liner and substantially deflated in FIG. 23. When installing a cured-in-place lining, a lateral pipe may be located by the distinctive "dimple" in the liner material 4 that is often present where the lateral pipe is located. It is also possible to locate a lateral pipe by placing a flashlight into the lateral prior to installation of the liner material or formation of the cured-in-place liner. The liner material 4 can be made of a plastic material that is substantially transparent or that permits the passage of some light. The curable material may also be selected to permit the passage of light. After the new liner is in place, a small camera can be placed on the cutter that is used to cut an entrance from the host conduit into the lateral pipe. The camera can facilitate locating the lateral pipe. A light may also be placed into the lateral pipe from the lateral pipe itself. The light source is preferably activated during the cutting and location steps. To facilitate recovering the light source from the lateral, the light source may be wrapped in a mesh covering to allow it to be fished out of the lateral and the host conduit.

In one embodiment of the invention, a lateral intercept branch liner is used to create a communication pathway into lateral pipes that may intersect with the host conduit that is undergoing lining. The lateral intercept liner can be formed by modifying the preliner. The position of the lateral can be measured in terms of distance and orientation relative to a reference point in the bore of the host conduit. The preliner is preferably modified at the point of intercept with the lateral by placing a branch liner tube at the place where the lateral intercepts the host conduit on the preliner. This branch liner can then be connected to the preliner.

The channels can be spliced into a new liner that is sized to fit the diameter of the lateral pipe. The lateral intercept branch liner may include a preliner and a compression liner with a modified channel or rib structure and a predetermined amount of curable material placed between the two liners. By forcing gas or liquid into the compression tube inside the lateral intercept liner, the two liners can be forced against the lateral pipe wall before the curable material is cured in place to create a new liner inside the lateral pipe.

As the preliner is placed or pulled into the host conduit, the lateral intercept liner may be fished into the lateral pipe by use of a fish that is maneuvered through the lateral pipe. The ribs on the lateral intercept liner are preferably integral to and communicate with the ribs on the preliner and can be inflated to calibrate the liner thickness or act as communication passageways.

After the preliner is inserted into the host conduit and the lateral intercept liner is inserted into the lateral pipe, the compression liner can be inserted into the host conduit (by either a pull-through method or an inversion method) and inflated. The compression liner is then pressed toward the preliner and host conduit, and the curable material is squeezed between the preliner and the compression liner before curing is accomplished.

Figure 24A:
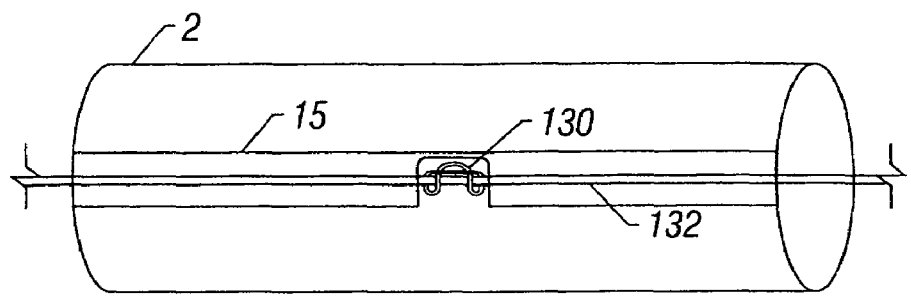
FIG. 24A depicts a pull-tab within a channel of the host conduit.
Figure 24B:
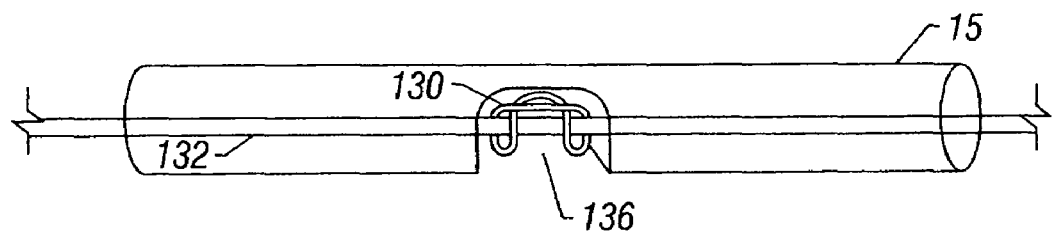
FIG. 24B depicts a cut-out section in a channel.

In one embodiment of the invention, a pull-tab 130 as depicted in FIGS. 24A,B,C, and D can be used to make it easier to pull a rope, a pull-tape, or a cable (e.g., fiber optic cable, a copper cable, etc.) from a communication channel into a lateral pipe that is connected to the host conduit. A fish (e.g., hook attached to a flexible wire) can be used to grab the pull tab 130, which facilitates the pulling of cable into the lateral pipe while preventing damage to the cable.

Figure 24C:
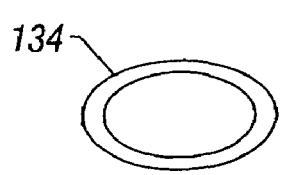
FIG. 24C depicts an open pull-tab.
Figure 24D:
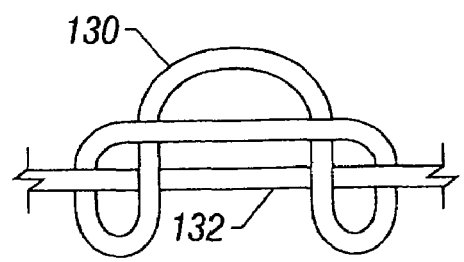
FIG. 24D depicts a pull-tab that has been formed into a loop.

The pull-tab can be looped onto the cable 132 before the cable is inserted into channel 15. A pull-tab 130 is attached to the fiber optic cable to form a loop, and the loop is slipped back into the flaccid tube after a line is attached to the pull tab as depicted in FIG. 24D. An open pull tab 134 that has not been formed into a loop is depicted in FIG. 24C. Cutout 136 may be formed into the channel 132 prior to the insertion of the channel into the host conduit. The cutout 136 is preferably made at a preselected location that will be adjacent to the lateral pipe opening once the lining member and/or channel 15 is positioned in the host conduit. Optionally, the cutout 136 can be made after cable 132, wire, and/or a pull-tape is inserted into the channel by carefully removing an outer section of the member or tube that defines the channel so as to avoid damaging the fiber optic cable, pull-tape, or other communication device.

Figure 28:
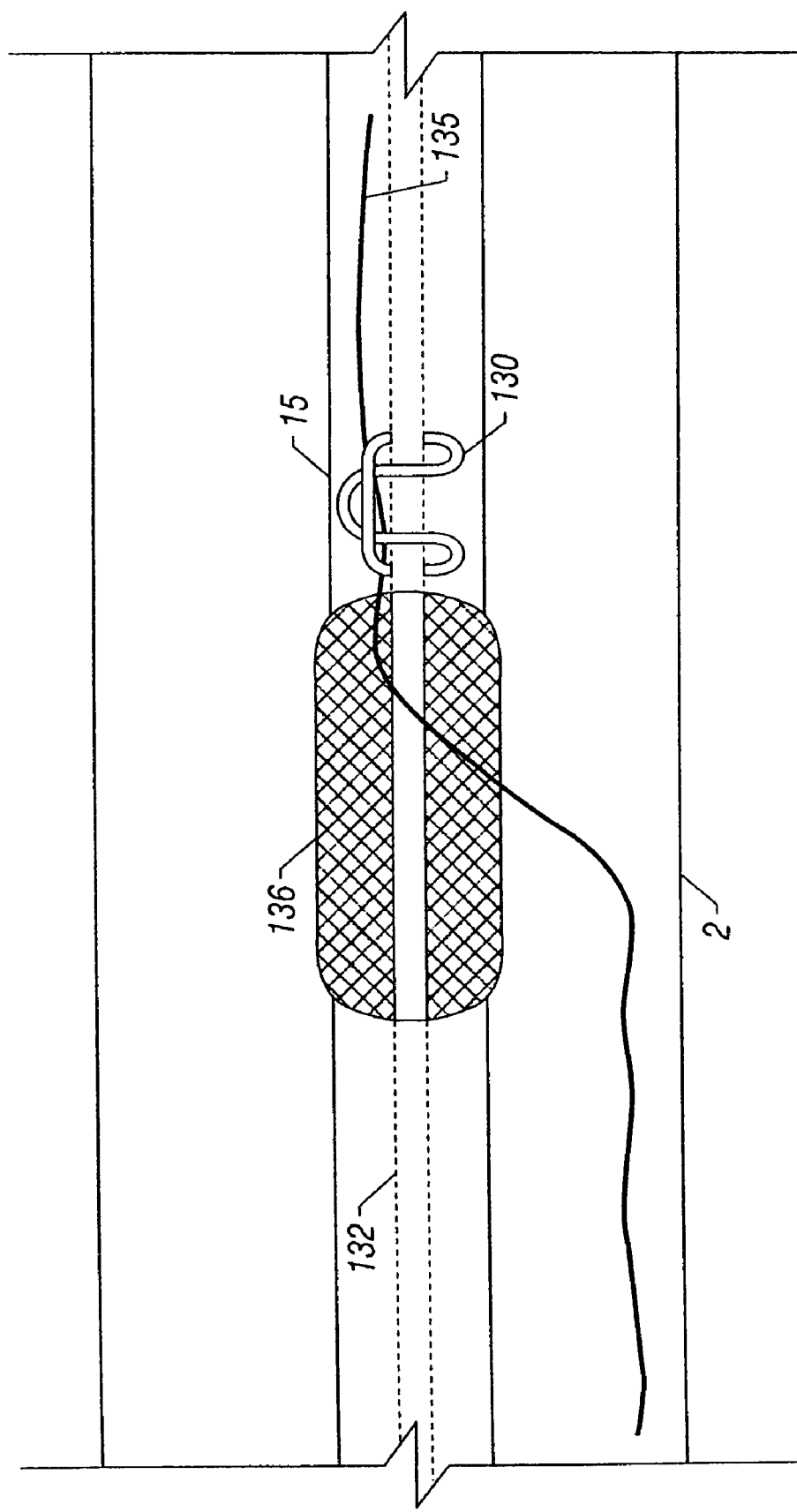
FIG. 28 depicts a pull-tab located in a tucked position within a channel.

FIG. 28 depicts a pull-tab 130 in the "tucked" position immediately adjacent to the cutout 136. Line 135 is attached to the pull-tab 130 and can be pulled in either direction to position the pull-tab near or into within cutout 136. Line 135 may be attached to the pull-tab and/or to the cable 132 with a slip knot that comes loose with the application sufficient tension once the pull-tab 130 is positioned to the desired location. Line 135 can be a rope and preferably runs to either end of the host conduit or to both ends. After the liner material has been inserted into the host conduit and once the location of the pull tab is near to the lateral opening into which the pull-tab and cable are to be pulled, then the line 135 attached to the pull-tab or fiber optic cable is pulled to release the pull-tab from the slot in the channel. The pull tab may be engaged with a fish or other grapple device and pulled into the lateral pipe. In this manner, damage to the cable (that might otherwise occur if the cable were fished directly into the lateral) can be prevented.

The insertion of a hollow pipe member into a communication channel can be facilitated by passing the hollow pipe member into one or more reduction dies that temporarily shrink the diameter of the hollow pipe member. The reduction dies allow the pipe to be compressed for easier insertion into the channel. As long as tension resulting from the pulling force to insert the pipe into the channel is maintained, the hollow pipe member will retain its compressed or shrinked profile. Only after the tension is eliminated and the hollow pipe member has been inserted into the channel will it expand to its original diameter.

Figure 25A:
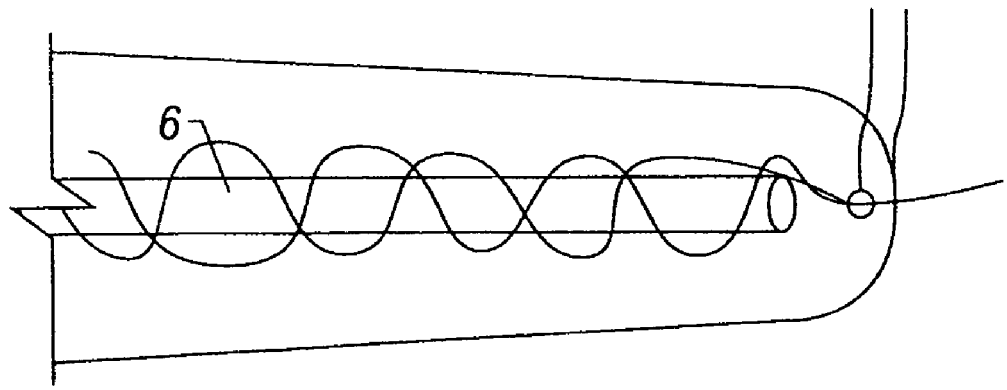
FIG. 25A depicts a tapered snout bag containing a pipe.
Figure 25B:
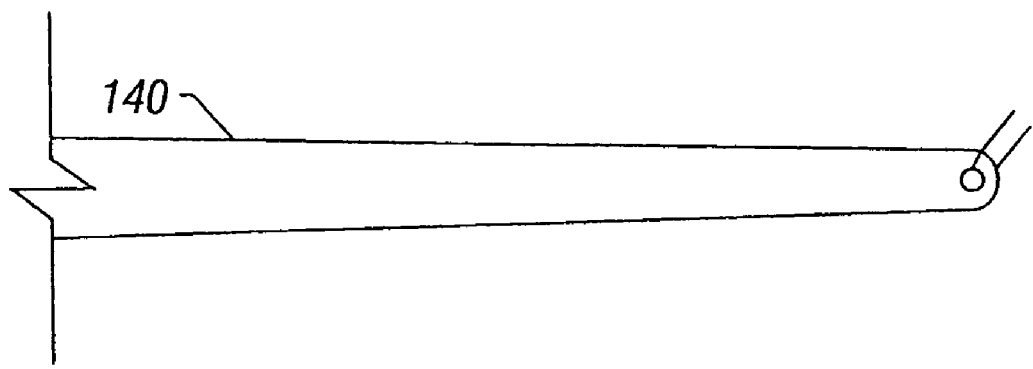
FIG. 25B depicts a tapered snout bag.

A tapered snout device 140 as depicted in FIGS. 25A and B may be used singly or in combination with the reduction die to facilitate the insertion of the hollow pipe member into the communication channel. The tapered snout bag can also be used in combination with a sled bag to insert the pipe into the channel and to insert liner material into a host conduit. The tapered snout device or bag 140 and the sled bag may be made of fabric or plastic and may be coated with Teflon or other friction reducing materials to permit easier passage into a channel. The shunt, pipe, or rib that is to be inserted into the channel may be made of high density plastic or may be of a more pliable plastic or other suitable materials.

Figure 29:
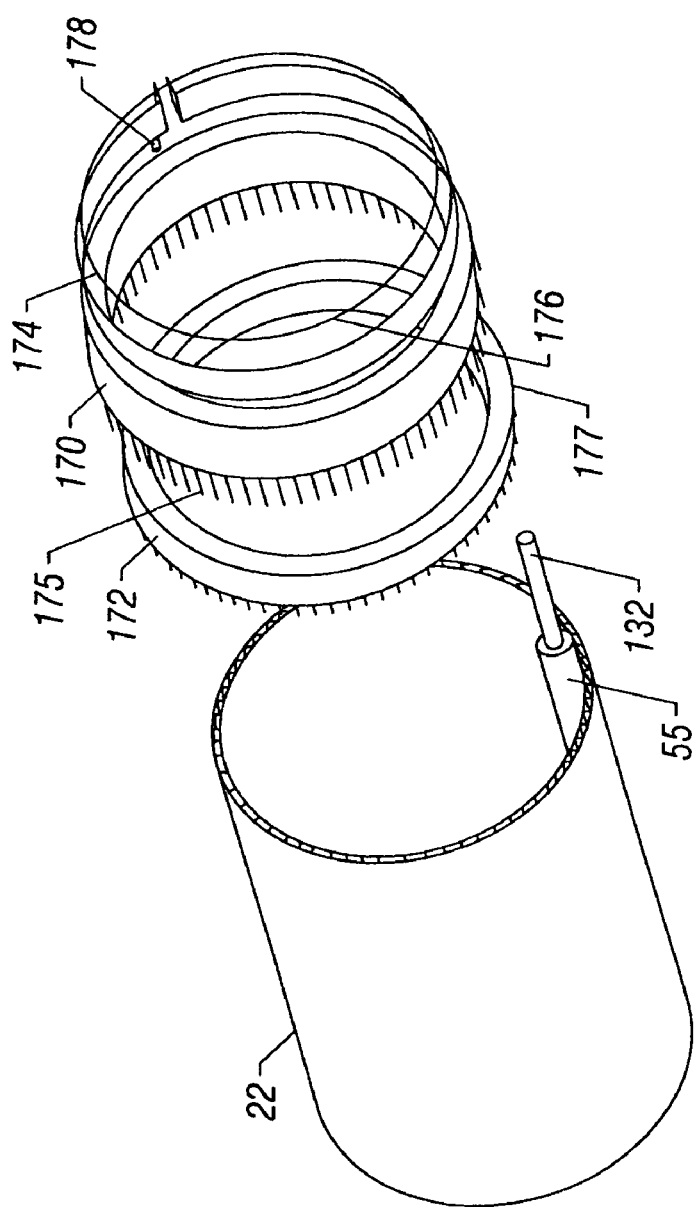
FIG. 29 depicts an exploded view of a lining member, smoothing device, air bladder sealing member, injection manifold, and clamping rings.
Figure 29:
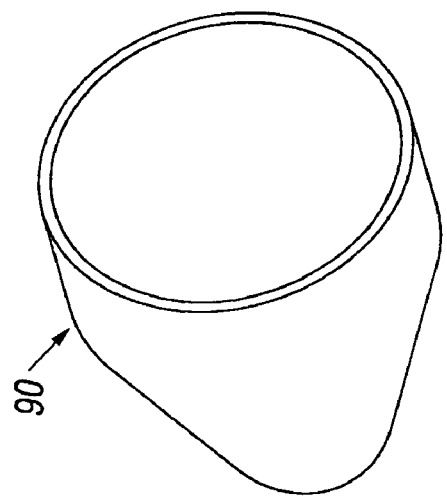

In one embodiment of the invention, an injection manifold system is used to introduce fluid (e.g., curable material) into the enclosure of the lining member to inflate the channels or spacers that are used to define the spacing therein that determines the ultimate thickness of the new liner. One example of an injection manifold system is depicted in FIG. 29. The system preferably includes an injection manifold 170, an air bladder sealing device 172, an outer clamping ring 174, and an inner clamping ring 176. The injection manifold 170 includes a plurality of nozzles 175 for introducing curable material into the channels formed by the spacers in liner member 22. Each of the channels preferably is separately inflatable by an individual nozzle contained on the injection manifold. Curable material may be supplied by a hose attached to the injection manifold. The inner clamping ring 176 and the outer clamping ring 174 can be used to clamp the air bladder sealing device 172 to the injection manifold 170. The nozzles 175 are preferably mateable with constricting bands 177 on the air bladder sealing device 172. Air is introduced through air inlet 178 between the injection manifold 170 and the air bladder 172 to constrict the bands 177 about the nozzles 175 and create an air tight seal to prevent curable material from leaking from the manifold. Once the seal is formed, curable material is injected into the channels, and smoothing mandrel 90 is passed through the interior of lining member 22 to help insure a uniform liner wall thickness. If any of the channels are overfilled with curable material, the action of the smoothing mandrel 90 within the lining member preferably forces any excess curable material out of the ends of the channels.

In the embodiments depicted in FIGS. 26A–D, a flow adapter 154 is used to insert a fluid into the channels 15 formed within the lining member 22 to inflate the channels 15 to a preselected dimension, such as when inflatable ribs are used to calibrate the wall thickness of the newly formed liner. The flow adapter 154 facilitates alignment of supply tubes 157 with the channels 15 or spacers to be inflated. The fluid used to inflate the channels or spacers is preferably the curable material. The flow adapter 154 preferably contains a plurality of supply tubes 157 that is equal to the number of channels 15 to be inflated. The flow adapter supply tubes 157 can be made of plastic, rubber, or other suitable materials, and the tubes are adapted to contain pressures greater than the pressure needed to inflate the channels, ribs, and compression tube. Each of the flow adapter tubes 157 preferably has a substantially rigid insert 150 (e.g., a rigid plastic or metal tube) attached to its end. The tubes 157 can be placed into a hose that supplies fluid from a regulated source of gas or liquid (e.g., curable material). A compression clamp 155 can be tightened around the hose to create a seal to prevent leakage of the fluid.

Figure 26A:
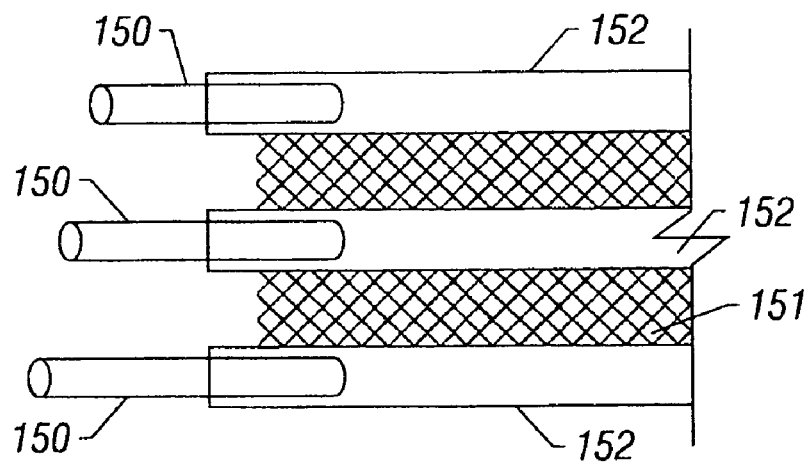
FIG. 26A depicts a flow adapter.
Figure 26B:
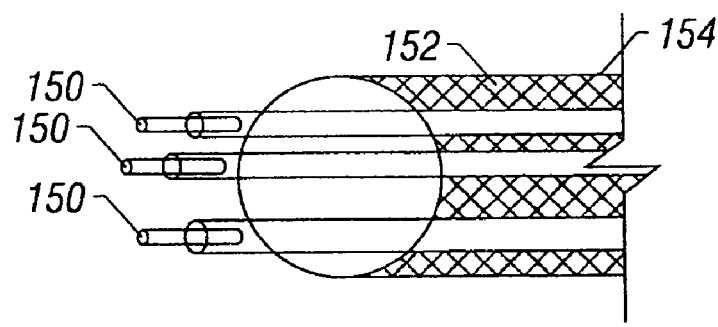
FIG. 26B depicts a flow adapter connected to the host conduit.
Figure 26C:
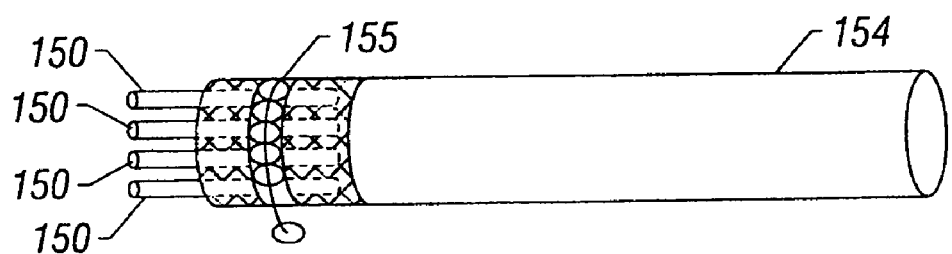
FIG. 26C depicts a flow adapter connected to the host conduit with a compression clamp.
Figure 26D:
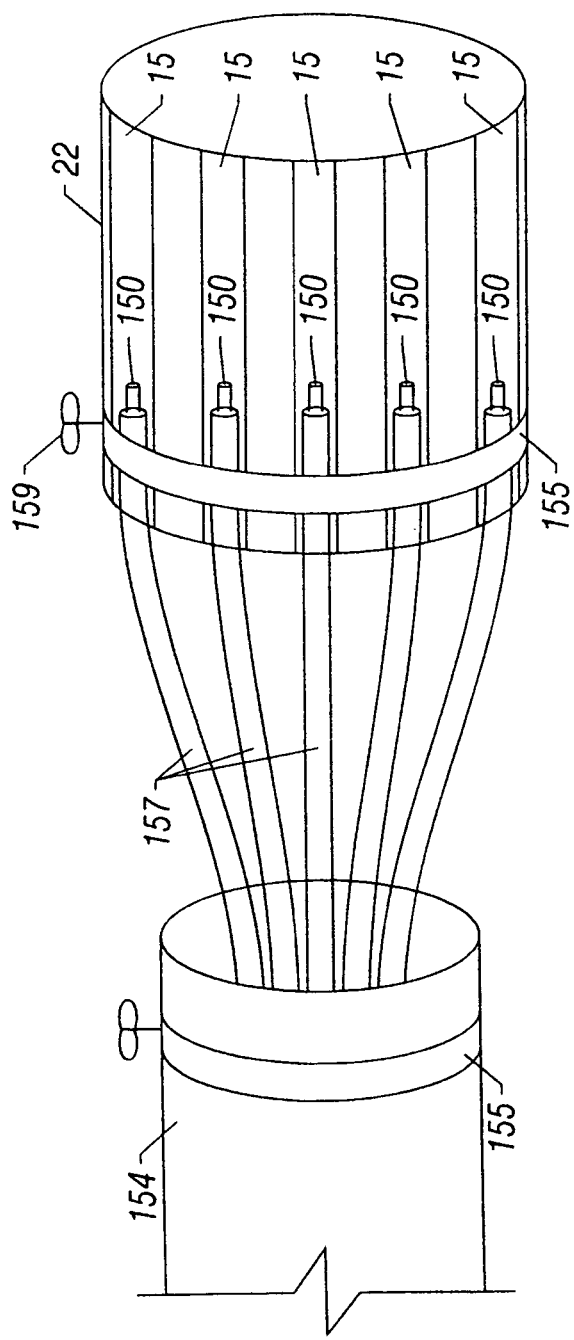
FIG. 26D depicts a flow adapter.

A compression clamp 155 can also be used to create a seal between the supply tubes 157 and the channels 15 of the lining member. The ends of the supply tubes 157 that are to be inserted into the channels or inflatable spacers can also be fitted with a substantially rigid insert 150. An additional padded compression clamp 155 can be tightened around the flow adapter tube at a location where the tube is inserted into the channel or rib. In this manner, an airtight seal is made by tightening the clamp around the tube. The supply tubes 157 preferably contain substantially rigid inserts 150 on each of their ends to keep the clamp pressure from closing the lumen of the supply tubes in order to permit gas or liquid flow through the supply tubes after tightener 159 is used to tighten the clamp 155 and create the seals on each end of the tubes 157. FIG. 26A depicts a portion of the flow adapter that will receive clamp pressure. Inserts 150 preferably fit inside the end portion 152 of supply tubes 157, which are separated by filler material 151.

Gas or liquid such as curable material can then be forced into the channels or ribs to inflate the ribs or channels to the desired pressure and size. The same flow adapter may instead be used to create either a vacuum or positive pressure in the channels or ribs to aid the introduction curable material into the channels or ribs.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An apparatus for lining an inner wall of a host conduit that is adapted to contain fluid, comprising:
    an inflatable lining member, the lining member being sufficiently flexible to permit it to be inserted through the host conduit during use and being capable of substantial flattening when it is in an uninflated state, the lining member comprising:
    a substantially flexible outer layer;
    a substantially flexible inner layer attached to the outer layer, the inner layer being inflatable to define a bore during use;
    an inflatable enclosure defined between the inner layer and the outer layer, the enclosure being inflatable separately from the inner layer and adapted to receive and contain curable material during use;
    one or more substantially flexible spacers positioned within the inflatable enclosure, the spacers forming one or more channels running in a direction lengthwise along the lining member;
    and wherein the lining member is expandable toward the inner wall of the host conduit during inflation of the inner layer, the lining member being further adapted to receive and contain the curable material within the enclosure while the curable material is being cured to form a new liner within the host conduit.

2. The apparatus of claim 1, wherein the spacers define a selected spacing between the inner layer and the outer layer during curing, and wherein the spacers are capable of being folded prior to insertion of the lining member into the host conduit.

3. The apparatus of claim 1, further comprising curable material located within the channels that is curable upon exposure to ultraviolet light, and wherein the lining member is substantially transparent to facilitate curing.

4. The apparatus of claim 1, wherein the spacers are seams within the enclosure that define the channels within the enclosure.

5. The apparatus of claim 1, wherein the spacers are corrugations within the enclosure that define the channels within the enclosure.

6. The apparatus of claim 1, further comprising a reinforcing mesh located around at least a portion of one of the channels to strengthen the channel.

7. The apparatus of claim 1, further comprising a reinforcing mesh located between the inner layer and the outer layer, the reinforcing mesh substantially surrounding the inner layer to reinforce the new liner.

8. The apparatus of claim 1, further comprising a hanging channel located on the inner layer that extends into the bore.

9. The apparatus of claim 1, further comprising a rib extending at least partially through one of the channels to form a surface that is more soft or more rigid than other channels after curing has taken place.

10. The apparatus of claim 1, wherein the enclosure comprises a width that is defined by the spacers, and wherein the spacers are substantially the same size so that the width of the enclosure is substantially uniform around a circumference of the lining member to permit the new liner to have a substantially uniform thickness.

11. The apparatus of claim 1, wherein the enclosure comprises a width that is defined by the spacers, and wherein at least one of the spacers has a different size than the others to vary the width of the enclosure around a circumference of the lining member to permit the new liner to have more thickness near a selected area of the inner wall of the host conduit.

12. The apparatus of claim 1, wherein at least one of the spacers is a substantially solid rib comprising a surface with a plurality of openings on the surface, the rib further comprising voids communicating with the openings that are adapted to contain curable material during use to reinforce the rib.

13. The apparatus of claim 1, further comprising a communication device positioned within one of the channels.

14. The apparatus of claim 1, wherein the spacers are arranged in at least two rows including a first row and a second row that is stacked on top of the first row.

15. The apparatus of claim 1, wherein the spacers comprise seams that are arranged in at least two rows including a first row and a second row that is stacked on top of the first row, and wherein the first and second rows of seams are substantially staggered from one another.

16. The apparatus of claim 1, wherein the spacers are configured to inhibit passage of curable material between adjacent channels to inhibit slump during use.

17. The apparatus of claim 1, wherein the channels comprise openings that form passages permitting fluid to pass between the channels.

18. The apparatus of claim 1, wherein the channels are separately inflatable and have a size that is determined by how much pressure is contained in each channel, the size of the channels being adapted to substantially increase or decrease in response to a change in the pressure.

19. The apparatus of claim 1, further comprising a support member between the spacers to maintain the spacers at a selected spacing relative to one another.

20. The apparatus of claim 1, wherein the outer layer of the lining member comprises an opening in a preselected area for passing curable material through the opening to the host conduit to repair a defect or damaged area in the host conduit.

21. The apparatus of claim 1, wherein the lining member has a unitary construction such that the inner layer, outer layer, and the spacers are formed together as a single component.

22. The apparatus of claim 1, wherein the lining member has a length that is greater than about 250 feet.

23. The apparatus of claim 1, wherein the enclosure has a width that is substantially equal to a wall thickness of the new liner.

24. The apparatus of claim 1, further comprising a protective covering for containing the lining member while the lining member is installed into the host conduit, the protective covering being adapted to deposit the lining member along the host conduit while inhibiting the lining member from moving against objects located on the inner wall of the host conduit.

25. The apparatus of claim 1, further comprising a lateral intercept liner extending laterally from the lining member and capable of being inserted into a lateral pipe that branches off from the host conduit.

26. The apparatus of claim 1, further comprising a tapered smoothing device that is sized to pass through the lining member and smooth the new liner as it is being formed in the host conduit.

* * * * *